US 6,499,105 B1

(12) United States Patent
Yoshiura et al.

(10) Patent No.: US 6,499,105 B1
(45) Date of Patent: *Dec. 24, 2002

(54) DIGITAL DATA AUTHENTICATION METHOD

(75) Inventors: Hiroshi Yoshiura, Kawasaki (JP); Kazuo Takaragi, Ebina (JP); Ryoichi Sasaki, Fujisawa (JP); Seiichi Susaki, Yokohama (JP); Hisashi Toyoshima, Hachioji (JP); Tsukasa Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 09/621,697

(22) Filed: Jul. 21, 2000

Related U.S. Application Data

(63) Continuation of application No. 09/090,419, filed on Jun. 4, 1998, now Pat. No. 6,131,162.

(30) Foreign Application Priority Data

Jun. 5, 1997 (JP) ............................................. 9-148061
Dec. 18, 1997 (JP) ............................................. 9-348860

(51) Int. Cl.[7] .............................. H04L 9/32; H04L 9/30
(52) U.S. Cl. ........................ 713/176; 713/170; 713/181; 705/51; 380/202
(58) Field of Search ................................. 713/150, 155, 713/168, 170, 176, 181, 201; 380/28, 30, 202; 705/51, 52, 53, 54, 55, 56, 57, 58

(56) References Cited

U.S. PATENT DOCUMENTS

| | | | |
|---|---|---|---|
| 5,530,759 A | 6/1996 | Braudaway et al. | 380/54 |
| 5,825,892 A | 10/1998 | Braudaway et al. | 380/51 |
| 5,872,848 A | 2/1999 | Romney et al. | 380/25 |
| 5,892,904 A | 4/1999 | Atkinson et al. | 713/201 |
| 5,898,779 A | 4/1999 | Squilla et al. | 380/23 |
| 5,960,081 A | 9/1999 | Vynne et al. | 380/10 |
| 6,131,162 A * | 10/2000 | Yoshiura et al. | 713/176 |
| 6,201,879 B1 | 3/2001 | Bender et al. | 382/100 |
| 6,359,985 B1 | 3/2002 | Koch et al. | 380/54 |

FOREIGN PATENT DOCUMENTS

| | | | |
|---|---|---|---|
| EP | 0590884 | 4/1994 | H04N/1/00 |
| EP | 0705025 | 4/1996 | H04N/1/40 |
| EP | 0854633 | 7/1998 | H04N/1/32 |
| EP | 0855829 | 7/1998 | H04N/1/327 |
| EP | 0859503 | 8/1998 | H04N/1/00 |
| JP | 53148918 | 12/1978 | H04N/5/66 |
| JP | 6431198 | 2/1989 | G09G/3/36 |
| JP | 6119225 | 4/1994 | G06F/12/00 |

OTHER PUBLICATIONS

W. Bender, "Techniques for Data Hiding", IBM Systems Journal, vol. 35, No. 3 & 4, 1996, pp. 313–336.
E. Okamoto, Ango Riron Nyumon (Introduction to Cryptography), Kyoritsu Shuppan Co., Ltd., 1993, pp. 133–137.
B. Schneier, Applied Cryptography, $2^{nd}$ Ed., John Wilsy & Sons, Inc., 1996, pp. 39–41.

(List continued on next page.)

Primary Examiner—Justin T. Darrow
(74) Attorney, Agent, or Firm—Antonelli, Terry, Stout & Kraus, LLP

(57) ABSTRACT

This invention provides a method for identifying a purchaser who purchased content from which an illegal copy was produced. A provider system encrypts purchased by the purchaser using a public key of a purchaser system and sends the encrypted content to the purchaser system. The purchaser system creates a digital signature of the content with the use of a private key of its own and embeds the created digital signature into the received content. When an illegal copy is found, the provider system verifies the digital signature, embedded in the illegal copy as a digital watermark, to identify the purchaser who purchased the content from which the illegal copy was produced.

60 Claims, 26 Drawing Sheets

OTHER PUBLICATIONS

Nikkei Electronics, N. 683, 1997, pp. 99–107.

Opendesign, Apr. 1996, pp. 4–22.

Opendesign, Apr. 1996, pp. 40–78.

Jyohoshori (Information Processing), Jyohoshori Gakk ai (Information Processing Society of Japan), vol. 38, No. 9, 1997, pp. 752–810.

N. Komatsu, et al, A Proposal on Digital Watermark in Document Image Communication and its Application to Realizing a Signature, Electronics and Communication in Japan 73(1990) May, No. 5, Part 1, New York, US, pp. 22–33.

B. Schneier, Applied Cryptography, 1996, John Wiley & Sons, US. New York, pp. 39–41.

Sasaki, et al, Security Technology for Open Networks, Hitachi Review, JP, Hitachi, Ltd., Tokyo vol. 46, No. 4, pp. 197–202.

M. Schneider et al, A Robust Content Based Digital Signature for Image Authentication, Proceedings of the International conference on Image Processing, US, New Yori, IEEE, pp. 227–230.

F. Rouaix, "A Web Navigator with Applets in Caml", 1996, Published by Elsevier Science B.V., Computer Networks and ISDN System 28, pp. 1365–1371.

S. Anderson, et al, "Sessioner: Flexible Session Level Authentication with off the shelf servers and clients", 1995 Elsevier Science B.V., Computer Networks and ISDN Systems 27, pp. 1047–1053.

\* cited by examiner

FIG. 15

| No. | DATE (EXPIRATION DATE) | MARK TYPE | VENDOR | URL OF THE VENDOR |
|---|---|---|---|---|
| 1 | 1998.1.1~1999.12.31 | B.Card | A | www.a.co.jp |
| 2 | 1998.1.1~1999.12.31 | B.Card | C | www.c.co.jp |
| 3 | 1998.4.1~2001. 3.31 | Card.E | A | www.a.co.jp |
| 4 | 1997.5.1~1998. 4.30 | B.Card | D | www.d.co.jp |
| .. | .. | .. | .. | .. |

1123 MARK MANAGEMENT DB

FIG. 20

| NO. | MARK MANAGER | EXPIRATION DATE | PUBLIC KEY |
|---|---|---|---|
| 1 | α | 1997.1.1~1998.12.31 | dayh8u4uf75kwef85o3yd |
| 2 | β | 1997.1.1~1998.12.31 | gfijvklsjt867wrf586d84w |
| 3 | γ | 1997.4.1~1999.3.31 | u57di853riwdyp0695utc7 |
| 4 | δ | 1997.1.1~1998.12.31 | ysfywe65uscnw3i40abyds |
| .. | .. | .. | .. |

1801 PUBLIC KEY DB

DIGITAL DATA AUTHENTICATION METHOD

This application is a continuation of U.S. patent application Ser. No. 09/090,419, filed Jun. 4, 1998, now U.S. Pat. No. 6,131,162 A.

BACKGROUND OF THE INVENTION

1. Field of the Invention

This invention relates to technology which authenticates the relation between digital data and an individual/organization.

2. Description of Related Art

As the information society has evolved recently, more and more digital data is used instead of traditional printed matter as communication media. Digital data is sometimes sold as a valuable commodity.

In the information society like this, some means are necessary to authenticate the relation between digital data and an individual/organization in order to prevent crimes or malicious actions including illegal copying, illegal alteration, and illegal use of digital data. For example, to check that digital data has been provided by an authentic organization, some means are necessary to authenticate the relation between the digital data and the authentic organization. Similarly, to check the source of digital data or to check the individual or organization owning the right to digital data, some means are necessary to authenticate the relation between the digital data and an individual or an organization.

Conventionally, a technique known as a digital signature has been used to authenticate the relation between digital data and an individual/organization.

As described in "ANGO RIRON NYUMON (Introduction to Cryptography)", pages 133–137, Kyoritsu Shuppan Co., Ltd. 1993, the digital signature technique, developed to prove the correctness of documents, combines public key cipher technology with one-way functions.

In this technology, a pair of keys, a private key S and a public key V which satisfy $g(f (n, S) V)=n$ and $f(g (n, V), S)=n$, is created first, where n represents data, and f and g represent functions. These formulae mean that data encrypted with the private key S may be decrypted by with the public key V and that, conversely, data encrypted with the public key V may be decrypted with the private key S. It should also be noted that it is virtually impossible to find the private key S from the public key V.

Once the private key S and the public key V are created, the creator passes the public key V to a partner and holds the private key S privately.

When the key creator sends data to the partner, the creator passes data to which a digital signature is attached. This digital signature is created by evaluating data with a predetermined one-way function and then encrypting the resulting evaluation value with the private key S.

The one-way function described above can calculate an evaluation value from data, but it is impossible to virtually calculate the original data from the evaluation value. In addition, it is necessary for the one-way function used in creating a digital signature to return a unique bit string for each piece of unique data; that is, the probability of the function returning the same bit string to two or more pieces of data must be very small. An example of such functions is a one-way hash function which evaluates data and returns a bit string as the evaluation value of the data. The evaluation value $h(D)$ calculated by the one-way hash function is called the hash value of D, where h is the one-way hash function and D is data.

Upon receiving data to which a digital signature is attached, the receiving partner evaluates the data with the one-way function to obtain an evaluation value and then checks if the evaluation value matches the value generated by decrypting the digital signature using the public key V. When they match, it is verified that the digital signature was created by the holder of the private key S corresponding to the public key V and that the digital signature is for the data that was received.

The technique described in "Applied Cryptography", John Wilsy & Sons, Inc. (1996), pp 39–41, is known as a technique for creating digital signatures for use by a plurality of persons that are attached to one piece of data.

When this technique is used, not all signature creators need to generate the hash value of data to create a digital signature; and instead, each of the second and subsequent signature creators calculates the hash value of the digital signature of the immediately-preceding creator to get his or her digital signature. That is, the first signature creator calculates the hash value of data and then encrypts the resulting hash value with his or her own private key to get a digital signature, as described above. The second creator encrypts the hash value of the first creator's digital signature with his or her own private key to get a digital signature. This is repeated for the subsequent signature creators. That is, the n-th creator encrypts the hash value of the (n−1)th creator's digital signature with his or her own private key to obtain a digital signature.

In this case, the digital signatures created by n signature creators are verified as follows. The final digital signature is decrypted by the public key of the final (n-th) signature creator, the decrypted digital signature is then decrypted by the public key of the (n-1)th signature creator, and so on, until the digital signature of the first signature creator is decrypted. If the result obtained by decrypting the signature by the public key of the first signature creator matches the hash value of the original data, it is determined that the digital signature was created by n signature creators each having his or her own public key and that the digital signature corresponds to the data. However, when the sequence in which the signature creators created signatures is not known, this technique requires that the above process be performed for the number of times generated by permutating all signature creators.

Also available for authenticating the relation between digital data and an individual/organization is a technique known as a digital watermark.

As described in Nikkei Electronics (1997), No. 683, pp. 99–107, this technique embeds management information, such as copyright information, into image data itself.

The digital watermark technique has the following features. Embedded data is not usually seen when image data containing that embedded information is displayed and, in addition, the image data itself displayed on a screen is almost not affected by the embedded information. Removing only the embedded information is difficult and, if the embedded information is removed accurately, the picture quality of the image data is significantly degraded. In general, even when the image data is compressed, embedded information may be restored to some extent.

A digital watermark technique which enables information to be embedded, not into image data, but into text data, drawing data (graphic data), and audio data has also been proposed.

In Nikkei Electronics (1997), No. 683, pp. 99–107, a technique using such digital watermark for preventing the illegal copy of contents, which are composed of digital data such as image data, is also described.

This technique embeds the identification of the contents purchaser into the contents in the form of a digital watermark. When illegally copied contents are seized, the embedded information is extracted to identify the person (that is, the purchaser) who produced the illegal copy.

The basic procedure for embedding purchaser's identification information is as follows:

(1) The provider (contents provider) assigns a unique number to a contents purchaser.
(2) The provider embeds the number of the contents purchaser into the contents in the form of a digital watermark.
(3) When illegally-copied contents are found and seized, the provider or inspection division extracts the number from the contents to identify the purchaser.
(4) The penalty is imposed on the purchaser for illegal copy or for lending the contents to a person who produced the illegal copy.

Recently, a WWW (World Wide Web) system, composed of a WWW server program and a browser program, has become popular as means for providing and sending information to a plurality of users over an open network such as the Internet. As this type of WWW system has become widely used, it has become necessary to be able to authenticate the relation between a Web page, which contains digital data made available on a WWW server, and an individual/organization in order to prevent crimes or malicious actions from occurring through the illegal use of the WWW system. For example, when a Web page is guaranteed by some authentic organization, it is necessary to be able to authenticate the relation between the Web page and the organization to allow the user to make sure that the Web page is truly guaranteed. Similarly, to check the individual's or organization right to a Web page creator or a Web page, the relation between the Web page and the individual or organization must be able to be authenticated.

As described in the April 1996 issue of "OPEN DESIGN" (published by CQ Publishing Co., Ltd. Issuer: Ryoji Gamou), pp. 4–22 and pp. 40–78, a WWW system features not only the easy-to-operate graphical user interface (GUI) but also the usability which allows the user to reference related information linked by hypertext. This WWW system has contributed to the fast growth of the Internet.

The outline of a WWW system introduced by the publication is as follows:

The WWW system is composed of at least one WWW server on which a WWW server program for publishing information runs and at least one client terminal on which a browser program for browsing published information runs. Data is transferred between the WWW server and the client terminal via the communication protocol called HTTP (HyperText Transfer Protocol).

To publish information on the WWW server, a server user must create a Web page containing data to be published. This page contains text data, image data, audio data, video data, and link data to other Web pages, all interconnected using a structure description language called HTML (Hyper Text Markup Language). Then, the user stores this Web page in a location (directory) in the WWW server so that it may be accessed from other computers (client terminals or other WWW servers).

To browse a published Web page from a client terminal using a browser program, a terminal user must type the URL (Universal Resource Locator) of the Web page. Then, the Web page is sent from the WWW server to the client terminal. The text data, image data, and video data of the Web page are displayed on the client terminal screen. Audio data, if included in the page, is produced from the speaker connected to the client terminal.

The recent trend is that the WWW system like this is used not only as the communication means but also in business. One such application is an electronic commerce system which provides the user with information on goods using this WWW system.

The overview of this electronic commerce system is described in "JYOHOSHORI (Information Processing), No. 9 of volume 38", pp. 752–810 (Issuer: Kouji Iizuka, Published by Jyohoshori Gakkai (Information Processing Society of Japan)).

The electronic commerce system described in the above-mentioned publication not only provides the user with information on goods but also settles accounts with the use of the cryptography technology, such as common key cipher and public key cipher, and the authentication technology such as digital signatures. In this system, many settlement methods, including bank settlements, credit card settlements, or electronic money settlements, are used.

In such an electronic commerce system, most vendors include into their web pages the image data, such as the logos of credit card companies, to allow the user to instantly select one of various payment methods. This is similar to a real-world (not a virtual world such as the Internet) store where the logos of the credit card companies are put up on the counter or in the show window.

Sometimes, a Web page may also contain image data, such as logo marks indicating the Web page creator or an authentic individual or organization which has authorized the Web page, to allow a Web page user to instantly ascertain who has created the Web page or that the Web page has been authorized by the authentic individual or organization.

SUMMARY OF THE INVENTION

The above-described digital watermark technology has the following problems.

First, the relation between information embedded as a digital watermark and an individual/organization indicated by the embedded information is not always guaranteed. That is, it cannot be always said that the information embedded in the digital data indicates the relation between the individual/organization and the digital data correctly.

For example, with the illegal copy prevention technique described above, a number embedded in the illegally-copied contents cannot always be used as a proof that the illegally-copied contents were purchased by the purchaser corresponding to that number. That is, because the number was given by the provider one-sidedly, the purchaser may insist that the number found in the copy is not the one assigned to him or her.

In the case of the Web page described above, there is a possibility of an illegal user forging information to pretend to be some other user and embedding it as a digital watermark or alternatively he may pretend that the information is guaranteed by an authentic organization.

Second, the relation between digital data and an individual/organization indicated by the information embedded as a digital watermark is not guaranteed.

For example, in the illegal copy prevention technique described above, there is no proof that a purchaser's number is embedded correctly in the content purchased by the purchaser. In other words, there is a possibility that a person other than the purchaser (for example, a person at the provider) has mistakenly or maliciously embedded the purchaser's number in a content not purchased by the purchaser.

In the case of the Web page described above, there is a possibility of an illegal user extracting a digital watermark, embedding it in a Web page by an individual/organization, and embedding it in his/her Web page to pretend to be the legal purchaser or to pretend that his/her page is guaranteed by an authentic organization.

Third, when there are many copyright holders for a single content with much copyright information that must be embedded in it with the use of the digital watermark technique, the quality of the content (image quality when the content is image data) is significantly degraded.

Fourth, the digital watermark technology is not suitable for digital data, such as a Web page, containing several types of data. For example, when the technology is used for digital data containing text data, drawing data, and image data, each type of data must be processed separately.

On the other hand, the digital signature technique is cumbersome because digital data as well as the digital signatures associated with the digital data must be managed as a pair. In addition, digital signatures, which can be separated from digital data much easier than digital watermarks, cannot be used for preventing illegal copies.

Another problem with digital watermarks and digital signatures is that, because they are invisible, the digital data user cannot immediately understand the relation between digital data indicated by digital watermarks or digital signatures and an individual/organization.

For example, digital watermarks and digital signatures do not present the user with information on the relation between a Web page and an individual/organization in the same way as a Web page including logo marks as image data does. This means that digital watermarks and digital signatures do not directly guarantee that the relation between digital data indicated by digital watermarks or digital signatures and an individual/organization corresponds to the relation between digital data presented directly to the user and the individual/organization.

On the other hand, a logo mark added to a Web page is image data. Therefore, it cannot be authenticated that the Web page actually contains data that is indicated by the relation between the logo mark and an individual/organization.

Take the logo mark of a credit card company for example. Imagine that an illegal user copies the logo mark of a credit card company from the Web page of a legal agent of the company, pastes it into an appropriate location of the Web page of the agent owned by the illegal user, and then stores the Web page in the WWW server so that any computer may access it. In this case, a consumer may judge, from the logo mark of the credit card company contained in the Web page of the agent owned by the illegal user, that the agent is legal and may send data necessary for settlement, such as a credit card number, to that WWW server. As a result, the illegal user is able to obtain the credit number of the consumer illegally and make an illegal profit.

In view of the foregoing, it is an object of this invention to provide a technique which authenticates the relation between digital data and an individual/organization more reliably. It is another object of this invention to provide a technique which directly presents the user with digital information on an individual/organization associated with digital data such that the relation between the digital information and the individual/organization corresponds to the relation between the digital data itself and the individual/organization.

To achieve the above objects, a method according to this invention is an embed-in-content information processing method for processing information embedded in a content using an electronic computer, the method comprising the steps of creating cryptographic information by encrypting specific data using a private key in accordance with a public key cipher system used by content-handling persons; and embedding the created cryptographic information into the content such that the cryptographic information cannot be separated from the content without using a predetermined rule.

Here, the description that the cryptographic information cannot be separated from the content without using the predetermined rule means that, when the predetermined rule is not used, the cryptographic information cannot be separated by a method other than the trial-and-error method.

In this method, the cryptographic information is extracted from the content containing the cryptographic information for use in decrypting with the use of a public key paired with the private key used by the content-handling persons, and then the decrypted result is verified to check if it matches the specific data. If the content in which the cryptographic information is embedded is an illegal copy, the content-handling person of the content from which the illegal copy was created may be identified.

In this case, this determination is made by verifying information embedded in the illegal copy, wherein the information depends on the private key known only to the content-handling person of the content and may be created only by the content-handling person of the content. This makes clear the correspondence between the information embedded in the illegal copy and the content-handling person of the content from which the illegal copy was created.

The cryptographic information embedded in the content may be a value dependent on the content into which the cryptographic information is to be embedded. For example, the value may be a digital signature generated by encrypting the hash value of the content. This value makes even clearer the correspondence between the information embedded in the illegal copy and the content-handling person of the content from which the illegal copy was created.

To achieve the above object, this invention is an embed-in-content information processing method for embedding information on k (k is an integer equal to or larger than 2) content-handling persons using an electronic computer, the method comprising the steps of embedding a digital signature into the content such that the digital signature cannot be separated from the content without using a predetermined rule, the digital signature being created by encrypting an n-bit hash value using a private key in accordance with a public key cipher system used by a first content-handling person, the n-bit hash value being obtained by evaluating the content with a first hash function; and sequentially repeating digital signature embedding for a second person to a k-th content-handling person, wherein, for an i-th content-handling person (i is an integer between 2 and k), the content into which the digital signatures of the first to an (i−1) content-handling persons are embedded is evaluated with a second hash function, wherein a resulting n/2-bit hash value is encrypted using the private key of the i-th content-handling person to generate the digital signature of the i-th content-handling person, and wherein the digital signature of the i-th content-handling person is embedded into the content in which the digital signatures from the first to the (i−1)th persons are already embedded such that the digital signature of the i-th content-handling person cannot be separated from the content without using a predetermined rule.

This method allows the k person's digital signatures to be embedded into the content using n+(k−1)·n/2 bits, with little effect on the security.

This invention is also an embed-in-content information processing method for embedding information on k (k is an integer equal to or larger than 2) content-handling persons using an electronic computer, the method comprising the steps of creating a digital signature of a first content-handling person by encrypting a hash value using a private key in accordance with a public key cipher system of the first content-handling person, the hash value being created by evaluating the content with a first hash function; sequentially repeating digital signature creation for a second person to a k-th content-handling persons to create the digital signatures of the content-handling persons; and embedding the digital signature of the k-th content-handling person into the content such that the digital signature cannot be separated from the content without using a predetermined rule, the digital signature being obtained by performing the digital signature creation for the k-th content-handling person, wherein, during the digital signature creation processing for an i-th content-handling person (i is an integer between 2 and k), a value dependent on the digital signature of the (i-)th content-handling person is encrypted using the private key of the i-th content-handling person to generate the digital signature of the (i−1)th content-handling person. According to the embed-in-content information processing method, when the value determined by the value of the digital signature is n bits long, embedding only n-bit data into the content enables information for verifying k content-handling persons to be embedded into the content.

To achieve the above object, this invention is an information authentication method managed by a manager trusted by both an information publisher and an information browser, wherein the information publisher adds multimedia data to information published by the information publisher in such a way that the multimedia data may be validated and wherein the information browser checks the validity of the information according to whether or not the multimedia data is validated.

In this method, the information is validated, for example, by the manager, who is contacted by all participants, validating multimedia data added to the information.

More specifically, a user who browses a Web page determines its validity according to whether the manager authenticates the validity of the image data pasted in the Web page, that is, whether the image data is valid, and whether the manager authenticates the fact that the image data is pasted in the Web.

In this method, when the multimedia data is validated, the information may be presented to the information browser as necessary. For example, when the image data is determined to be valid in the above Web page, the information may be filtered so that the Web page may be displayed.

To achieve the above objects, this invention provides a method for creating authenticatable digital data including authentication data for authenticating the digital data using an electronic computer, the method comprising the steps of generating mark data recognizable by a user when the user uses the digital data; generating watermark-embedded mark data wherein specific information is embedded as a digital watermark into the mark data; and including the watermark-embedded mark data into the digital data to generate the authenticatable digital data.

In this method, the specific information may be a hash value generated by evaluating the digital data with a predetermined hash function.

The specific information may also be a digital signature generated by encrypting an evaluation value, generated by evaluating the digital data with a predetermined function, with a private key according to predetermined public key cipher.

According to those methods, the mark may be validated with the information embedded in the watermark-embedded mark data. The hash value embedded as the digital watermark may be used to authenticate that the mark is given to the digital data. The digital signature embedded as the digital watermark may be used to authenticate the validity of an individual/organization which guarantees the mark.

This invention also provides a plurality of systems for realizing the methods.

For example, this invention provides a content distribution system comprising a distribution system outputting a content to be distributed and a content receiving system receiving the distributed content, wherein the distribution system comprises encrypting means for encrypting a content to be distributed and wherein the receiving system comprises decrypting means for decrypting a distributed content; signature creating means for creating cryptographic information by encrypting specific data using a private key in accordance with a public key cipher system used by a user of the receiving system; and signature embedding means for embedding the created cryptographic information into the content such that the cryptographic information cannot be separated from the content without using a predetermined rule.

This invention also provides a content distribution system wherein the decrypting means, the signature creating means, and the signature embedding means are configured such that decrypting cannot be performed by the decrypting means before the cryptographic information is created and embedded by the signature creating means and the signature embedding means and wherein it is difficult to modify the receiving system such that decrypting is performed by the decrypting means before the cryptographic information is created and embedded by the signature creating means and the signature embedding means, respectively.

This invention also provides a content distribution system wherein the encrypting means of the distribution system encrypts the content using the public key of the user of the receiving system and the decrypting means of the receiving system decrypts the content encrypted using the private key of the user of the distribution system.

These content distribution systems may have a verification system comprising signature extracting means for extracting cryptographic information from the content in which cryptographic information is embedded and signature verifying means for verifying that a result obtained by decrypting the extracted cryptographic information using a public key used by content-handling persons matches the specific data.

In these content distribution systems, the signature creating means of the receiving system may use information containing a decrypted-content-dependent value as the specific data and may use a digital signature which the receiving system user has for the content as the cryptographic information, the digital signature being generated by encrypting the specific data using the private key in accordance with the public key cipher system used by the receiving system user.

This invention also provides a data processing system used to attach a signature to a content. This system comprises digital signature creating means for calculating a hash value by evaluating the content with a hash function and then encrypting the calculated hash value with a private key of a user of the data processing system in accordance with the public key cipher system used by the user to generate a digital signature; and digital watermark creating means for embedding the created digital signature into the content as a digital watermark.

This invention also provides a system comprising a generation system which generates authenticatable digital data and an authentication system which authenticates authenticatable digital data, wherein the generation system comprises means for generating mark data recognizable by a user when a user uses the digital data; means for generating watermark-embedded mark data into which specific information is embedded as digital watermark; and means for including the watermark-embedded mark data into the digital data to generate the authenticatable digital data and wherein the authentication system comprises means for extracting the mark data from the authenticatable digital data; means for extracting from the extracted mark data the predetermined information included as the digital watermark; and means for authenticating the digital data based on the extracted information.

More specifically, the authenticatable digital data is a Web page containing mark data. Based on the information embedded in the mark data as the digital watermark, the authentication system authenticates the Web page as well as the contents output by the mark data when the Web page is browsed. In this case, note that the individual/organization which generates the authenticatable digital data need not be the individual/organization which publishes this Web page. In this case, the individual/organization, which generates the Web page containing the authenticatable digital data according to a request from the individual/organization which publishes the Web page, may also create that Web page.

This invention also provides a recording medium including therein a program to be run by an electronic computer to execute the methods described above.

For example, this invention provides a computer-readable medium having stored therein a program which causes an electronic computer to perform a program comprising the steps of generating mark data recognizable by a user when the user uses the digital data; generating watermark-embedded mark data into which specific information is embedded as a digital watermark; and including the watermark-embedded mark data into the digital data to generate the authenticatable digital data.

BRIEF DESCRIPTION OF THE DRAWINGS

FIG. 15 is a diagram showing the contents of the mark management DB used in the fourth embodiment of this invention.

FIG. 20 is a diagram showing the contents of the mark management DB used in the fifth embodiment of this invention.

DETAILED DESCRIPTION OF THE PREFERRED EMBODIMENTS

The following describe some embodiments of this invention.

First, a first embodiment, a second embodiment, and a third embodiment which authenticate the relation between digital data and an individual/organization more reliably are described.

First, the first embodiment will be described.

The first embodiment explains an example of authentication of the relation between digital data and an individual/organization. More specifically, the embodiment explains an example of authentication of the relation between a content, one type of digital data, and a content purchaser, one type of individual/organization, in order to prevent the content from being copied illegally. However, it should be noted that the individual/organization need not always be a content purchaser. Depending upon the situation in which this embodiment is used, the first embodiment may be modified such that the individual/organization is a content copyright holder, a content vendor, a content wholesaler, or some other related person. In addition, in this embodiment and in the second and third embodiment that will be described later, the content is assumed to be image data. These embodiments may also be modified so that the content may contain other types of data, such as text data, drawing data, audio data, or video data.

Figure 1:
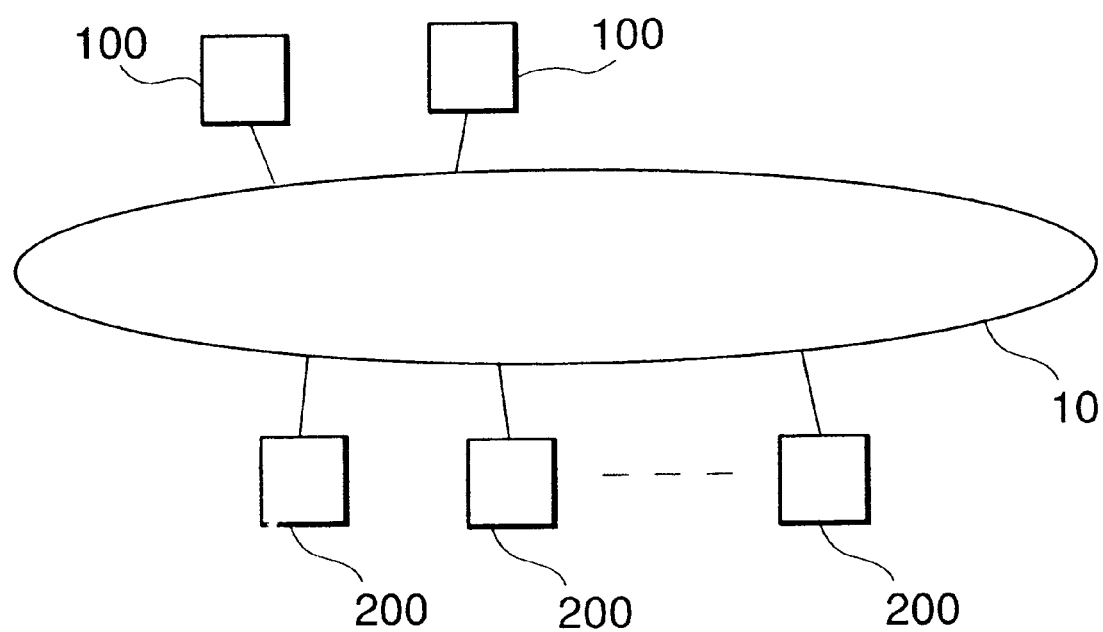
FIG. 1 is a block diagram showing the configuration of a content distribution system used in a first embodiment of this invention.

FIG. 1 shows the configuration of a content distribution system used in this embodiment.

As shown in the figure, the content distribution system comprises a plurality of provider systems 100, each distributing digital data contents, and a plurality of purchaser systems 200 each receiving distributed contents.

Contents and other types of information are transferred between the provider systems 100 and the purchaser systems 200 over a network 10 to which the provider systems 100 and the purchaser systems 200 are connected. However, the network 10 is not always necessary. Contents and other types of information, stored on a storage medium such as a floppy disk, may also be transported or mailed between the provider system 100 and the purchaser system 200.

Figure 2:
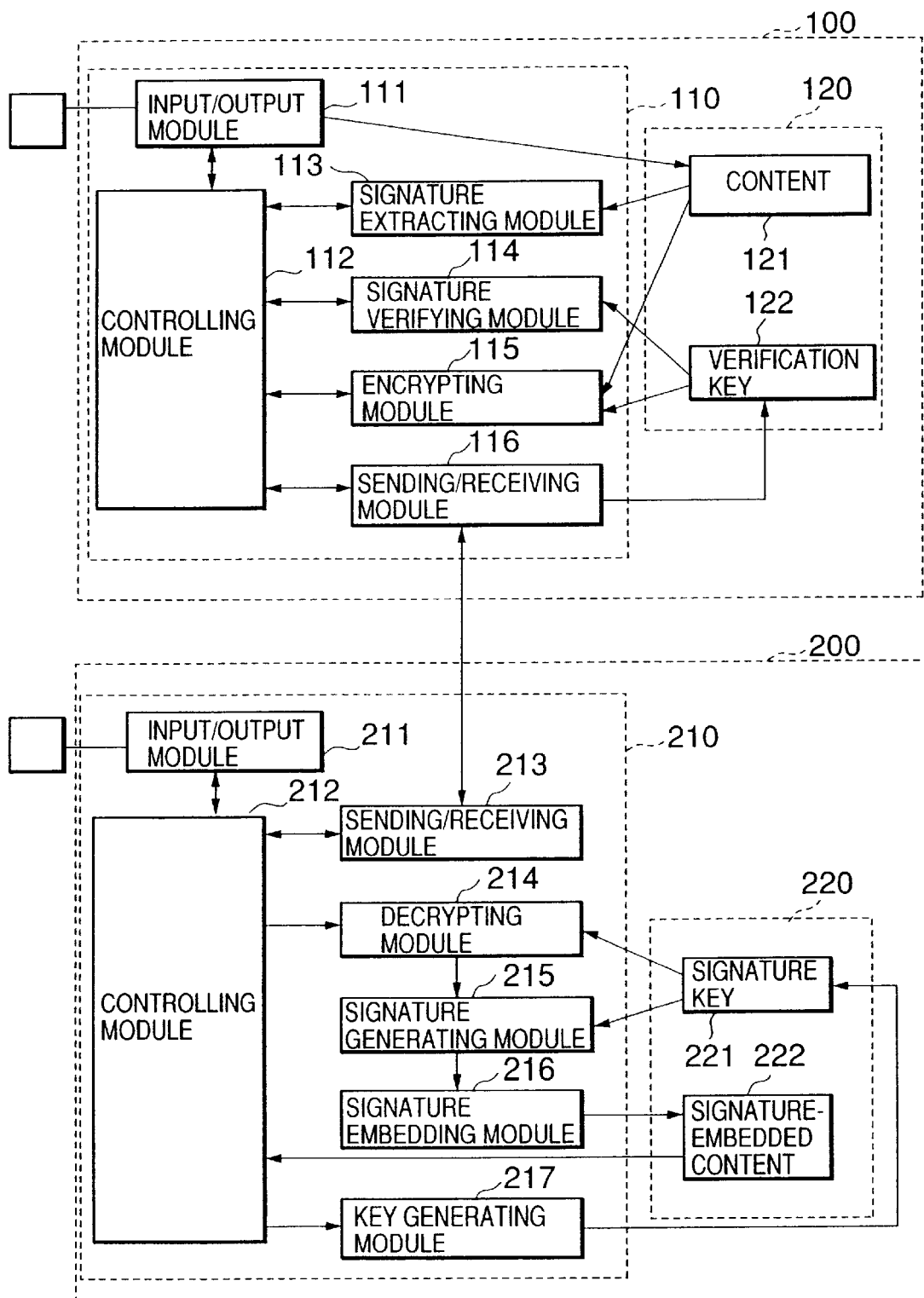
FIG. 2 is a block diagram showing the configuration of a provider system and a purchaser system used in the first embodiment of this invention.

FIG. 2 shows the configuration of the provider system 100 and the purchaser system 200.

As shown in the figure, the provider system 100 comprises a processing module 110 and a storage module 120. The processing module 110 comprises an input/output module 111 which performs input/output operations, a controlling module 112 which controls the components of the provider system 100, a signature extracting module 113 which extracts a digital signature from a content containing the digital signature, a signature verifying module 114 which verifies a digital signature, an encrypting module 115 which encrypts a content, and a sending/receiving module 116 which sends or receives data to or from each purchaser system 200. The storage module 120 stores contents 121 and verification keys 122. Note that the verification key 122 corresponds to the public key explained in Description of Related Art.

As shown in figure, the purchaser system 200 comprises a processing module 210 and a storage module 220. The processing module 210 comprises an input/output module 211 which performs input/output operations, a controlling module 212 which controls the components of the purchaser system 200, a sending/receiving module 213 which sends or receives data to or from the provider system 100, a decrypting module 214 which decrypts an encrypted content, a signature generating module 215 which generates a digital signature, a signature embedding module 216 which embeds a digital signature into a content, and a key generating module 217 which creates a signature key (private key) and a verification key (public key). The storage module 220 stores signature key 221 and signature-embedded contents 222. Note that the signature key 221 corresponds to the private key explained in Description of Related Art.

Figure 3:
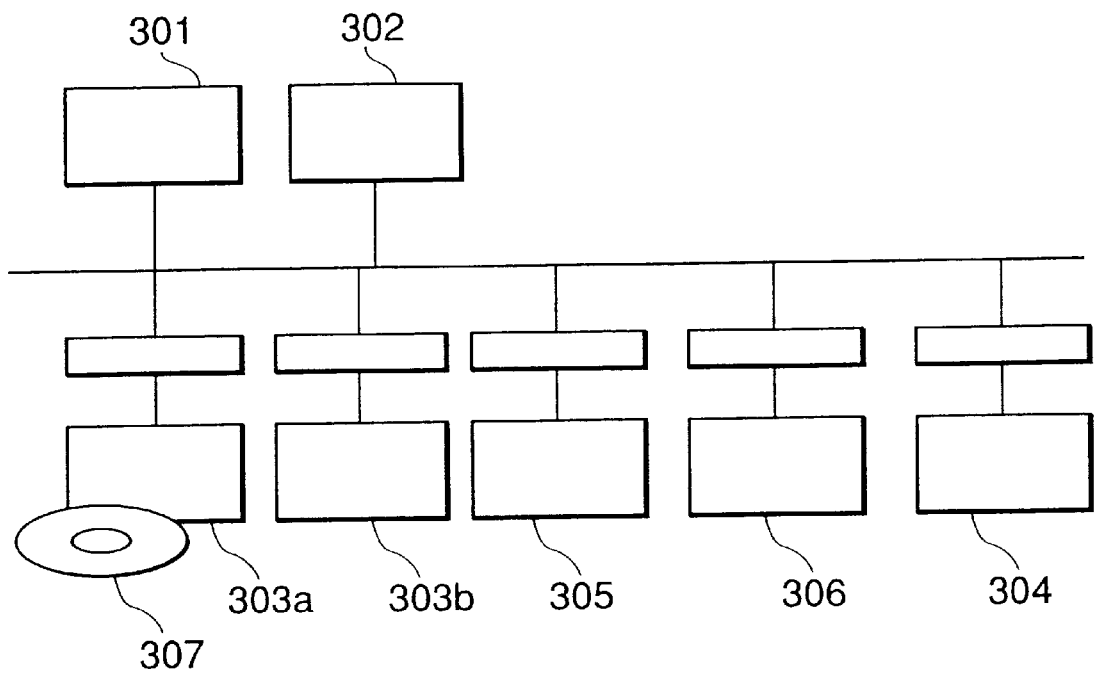
FIG. 3 is a diagram showing the general configuration of an electronic computer system used in the first invention of this invention.

As shown in FIG. 3, the provider system 100 and the purchaser system 200 may be built into an electronic computer system with a standard configuration where a CPU 301, main storage 302, an external storage unit 303b which is a hard disk, an external storage unit 303a which is not a hard disk, a communication control unit 304, an input unit 305 such as a keyboard or a pointing device, and an output device 306 such as a display unit are provided.

The processing module 110 of the provider system 100 and the components of the processing module 110 are processes implemented in the electronic computer system when the CPU 301 executes a program loaded into the main storage 302. In this case, the main storage 302 and the external storage units 303a and 303b are used as the storage module 120 of the provider system 100. Similarly, the processing module 210 of the purchaser system 200 and the components of the processing module 210 are processes implemented in the electronic computer system when the CPU 301 executes a program loaded into the main storage 302. In this case, the main storage 302 and the external storage units 303a and 303b are used as the storage module 220 of the purchaser system 200.

A program for creating the provider system 100 and the purchaser system 200 in an electronic computer system is loaded into the main storage 302 for execution by the CPU 301. The program is pre-recorded on the external storage unit 303b and is loaded, as necessary, into the main storage 302 for execution by the CPU 301. Alternatively, the program is pre-recorded on a portable recording medium 307 such as a CD-ROM disc and is loaded directly, as necessary, via the external storage unit 303a for execution by the CPU 301. It is also possible that the program is installed from the portable recording medium 307 via the external storage unit 303a used for portable recording medium onto the external storage unit 303b such as a hard disk and is loaded, as necessary, into the main storage 302 for execution by the CPU 301.

The following explains in detail a sequence of operations of the provider system 100 and the purchaser system 200 in time sequence, from content distribution to illegal copy detection.

First, before a content is distributed, the key generating module 217 generates a signature key and a verification key under control of the controlling module 212 of the purchaser system 200. These keys are generated in the same way as the conventional private key and public key. In the following description, the private key is called the signature key, and the public key is called the verification key.

Next, the key generating module 217 stores the generated signature key in the storage module 220 and, at the same time, passes the generated verification key to the controlling module 212. Upon receiving the verification key, the controlling module 212 sends it to the provider system 100 via the sending/receiving module 213. In the provider system 100, the verification key is received by the sending/receiving module 116 and is stored in the storage module 120.

After the above operation, the provider system 100 sends a content to the purchaser system 200 as follows.

Figure 4:
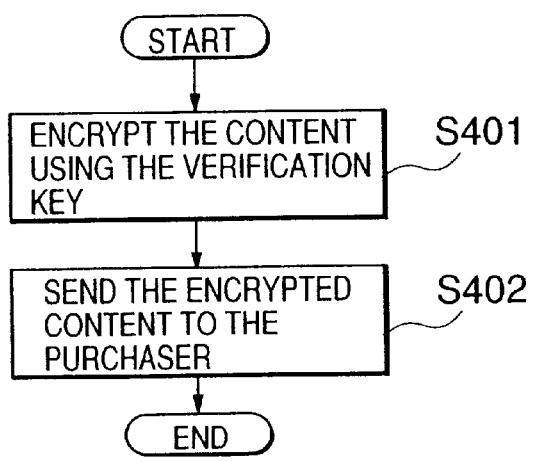
FIG. 4 is a flowchart showing the processing steps of content distribution of the first embodiment of this invention.

The controlling module 112 works with the input/output module 111 to accept the content to be distributed and stores it in the storage module 120. Then, as shown in FIG. 4, the controlling module 112 controls the encrypting module 115 to encrypt the stored content 121 with the use of the verification key 122 stored in the storage module 120 (step 401) and sends the encrypted content to the purchaser system 200 via the sending/receiving module 116 (step 402).

The purchaser system 200 performs the following operation when it receives the encrypted content.

Figure 5:
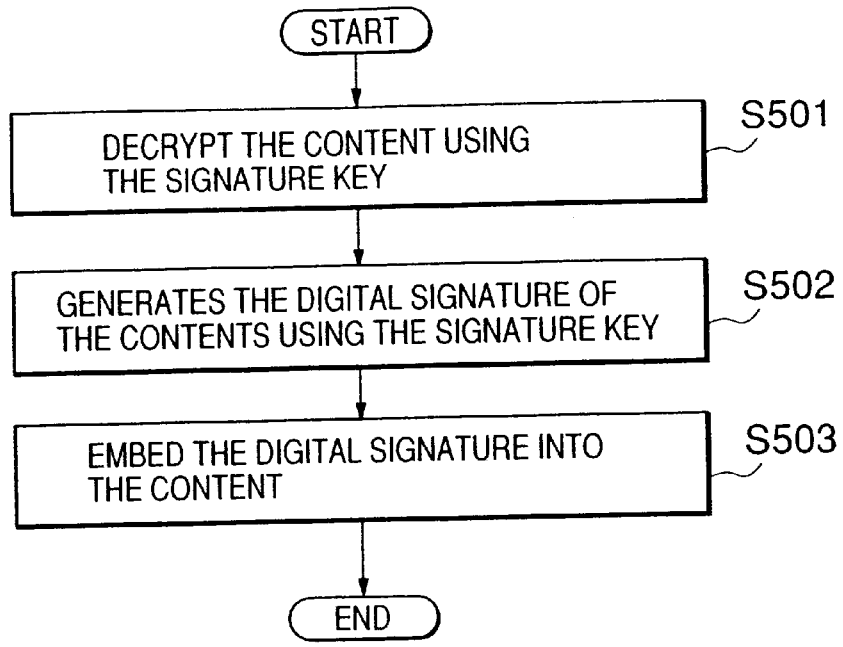
FIG. 5 is a flowchart showing the processing steps of content distribution of the first embodiment of this invention.

As shown in FIG. 5, the controlling module 212 tells the decrypting module 214 to decrypt the encrypted content, received by the sending/receiving module 213, using the signature key stored in the storage module 220 (step 501) and then asks the signature generating module 215 to generate the digital signature of the decrypted content using the signature key stored in the storage module 220 (step 502).

To generate the digital signature, the signature generating module 215 calculates the 160-bit hash value of the decrypted content using a predetermined one-way hash function and then encrypts the resulting 160-bit hash value using the signature key stored in the storage module 220.

Once the digital signature is generated, the controlling module 212 tells the signature embedding module 216 to embed the digital signature into the decrypted content inseparably according to a predetermined rule (step 503) and stores then the signature-embedded content in the storage module 220. The digital signature is embedded, for example, by the digital watermark technique explained in Description of Related Art.

Now, assume that the purchaser has created an illegal copy of the content which is stored in the storage module 220 and into which the digital signature is embedded (without an appropriate authority to create a copy) and has transferred the created copy to a third party. As explained in Description of Related Art, the purchaser cannot remove the digital signature, which is embedded in the content, for example, in the form of a digital watermark, from the content. That is, the purchaser cannot create a complete but illegal copy which has no digital signature embedded.

When the illegally-copied content in which the digital signature is embedded is seized, the provider system 100 performs the following to identify the purchaser who created the illegal copy.

Figure 6:
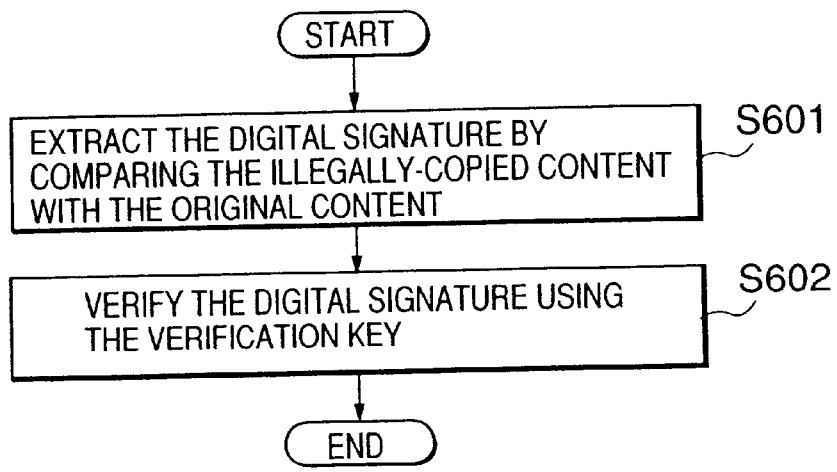
FIG. 6 is a flowchart showing the processing steps of content distribution of the first embodiment of this invention.

That is, as shown in FIG. 6, the controlling module 112 of the provider system 100 works with the input/output module 111 to store the illegally-copied content in the storage module 120 and then tells the signature extracting module 113 to extract the digital signature from the illegally-copied content (step 601). Note that the storage module 120 of the provider system 100 contains the original content (with no digital signature embedded) of the illegally-copied content. This allows the signature extracting module 113 to find the difference between the original content and the illegally-copied content and therefore to extract the digital signature. If it is possible, the digital signature may be extracted according to the rule by which the digital signature was embedded into the content.

Next, the controlling module 112 tells the signature verifying module 114 to verify the digital signature (step 602). To do so, the signature verifying module 114 decrypts the extracted digital signature using the verification key 122 of a user stored in the storage module 120 and compares the resulting value with the hash value obtained by evaluating the original content in the storage module 120 with the use of the same one-way hash function as that used by the purchaser system 200. If the rule used by the purchaser system 200 to embed the digital signature into the content is known only to the provider and if the digital signature may be removed from the content according to that rule, the content from which the digital signature is removed may be used instead of the original content.

If the hash value obtained by evaluating the original content matches the value of the decrypted digital signature, it is determined that the illegal copy was created by the purchaser corresponding to the verification key used in decrypting the digital signature. If not, the digital signature extracted from the illegal copy is decrypted with the use of the verification key of some other purchaser and a check is made to see if the decrypted value matches the hash value of the original content.

The first embodiment of this invention is as described above.

If, in the above embodiment, the purchaser system 200 only decrypts a content received from the provider system 100 but does not embed a digital signature into it, the purchaser is able to obtain the content with no purchaser information embedded. In this case, the purchaser cannot be identified from an illegal copy of the content.

To avoid this, the above-described controlling module 212 is configured to perform both content decryption and digital signature creation/embedding. Hardware protection and software protection are used to ensure that these two will always be paired. More specifically, the provider provides the purchaser with a program designed to perform both digital signature creation and digital signature embedding. The system is designed to allow only this program to decrypt a content sent from the provider system 100. Also, to prevent this program from being modified, this program is designed to have some means for protecting it against modification.

Decryption and digital signature creation/embedding may also be carried out, not by the CPU 301 of the electronic computer shown in FIG. 3, but by a provider-supplied IC card which is protected against modification. In this case, upon receiving an encrypted content from the computer, the IC card which is connected to the computer returns the content in which digital signature is embedded.

A hardware unit specifically designed to protect against modification may also be used.

As mentioned above, in order to identify the purchaser who created an illegal copy, the first embodiment uses a signature key (private key) which is known only to the purchaser and performs verification using information which may be created only by the purchaser. Therefore, information embedded in an illegal copy is more useful in identifying the purchaser who created the illegal copy. In addition, because a digital signature based on a content-dependent hash value is embedded, the correspondence between the purchaser and the content is more clearly understood.

Provided that embedded information is integrated into the content inseparably, data known to the provider system 100 and purchaser system 200 may also be used instead of a digital signature based on a content-dependent hash value. For example, a digital signature based on the hash value of text data, such as a purchaser's name, may be used.

The following describes the second embodiment of this invention:

The second and third embodiments explain an example of authentication of the relation between digital data and individuals/organizations. More specifically, the embodiments explain an example of authentication of the relation between a content, one type of digital data, and a plurality of content copyright holders, one type of individual/organizations, in order to display the plurality of copyright holders of the content. However, it should be noted that the plurality of individuals/organizations need not always be a plurality of content copyright holders. Depending upon the situation in which the second embodiment and the third embodiment which will be described later are used, the embodiments may be modified such that the individuals/organizations are a plurality of content purchasers, a plurality of content vendors, a plurality of content wholesalers, or a combination of different types of individuals/organizations.

The second embodiment relates to a distribution content creation system which creates a distribution content in which a plurality of digital signatures of holders, such as a plurality of copyright holders, are embedded.

Figure 7:
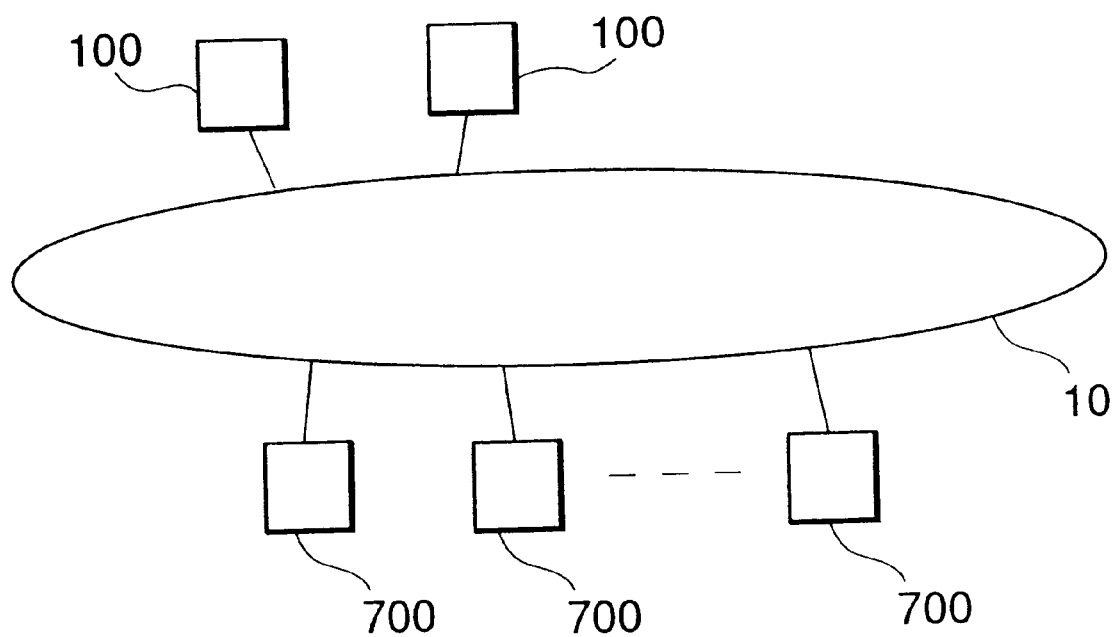
FIG. 7 is a block diagram showing the configuration of a second content distribution system used in a second embodiment of this invention.

FIG. 7 shows the configuration of the distribution content creation system.

As shown in the figure, the distribution content creation system comprises one or a plurality of provider systems 100, each distributing contents, and a plurality of right-holder systems 700 used by right holders. Contents and other types of information are transferred between the provider systems 100 and the right-holder systems 700 over a network 10 to which the provider system 100 and the right-holder systems 700 are connected. However, the network 10 is not always necessary. Contents and other types of information, stored on a storage medium such as a floppy disk, may also be transported or mailed between the provider system 100 and the right-holder system 700. In addition, the provider system 100 used in this distribution content creation system may function also as the provider system 100 in the content distribution system shown in FIG. 1 to combine two systems into one.

Figure 8:
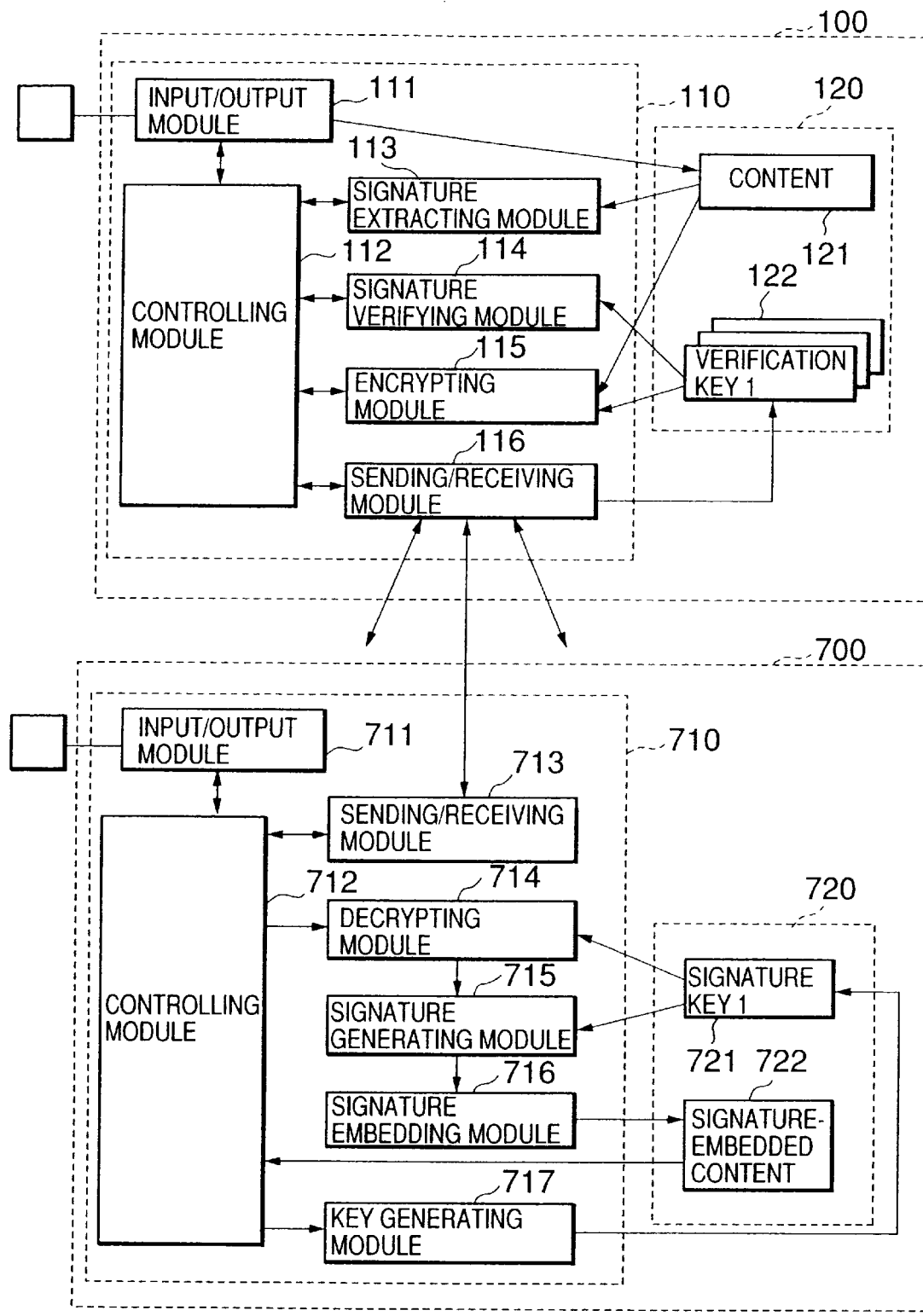
FIG. 8 is a block diagram showing the configuration of a provider system and a right-holder system used in the second embodiment of this invention.

FIG. 8 shows the configuration of the provider system 100 and the right-holder system 700.

As shown in the figure, the provider system 100 has the same configuration as that of the provider system shown 100 in FIG. 2, and the right-holder system 700 has the same configuration as that of the purchaser system 200 shown in FIG. 2. Like the systems in the first embodiment, both the provider system 100 and the right-holder system 700 may be implemented on an electronic computer such as the one shown in FIG. 3.

In the distribution content system like this, a distribution content in which a plurality of signatures of right holders are embedded is created as described below.

Assume that the signature key and the verification key of the provider system 100 have already been generated and that the verification key of the provider system 100 has been distributed to each right-holder system. Also assume that each right-holder system 700 encrypts a content or various types of information using the verification key of the provider system 100 before sending them to the provider system 100 and that the provider system 100 decrypts received information using the signature key of the provider system 100. The encryption configuration and decryption configuration of information sent from each right-holder system 700 to the provider system 100 are omitted in FIG. 7, because they are the same as those of information sent from the provider system 100 to the right-holder system 700 or to the purchaser system 200.

In this situation, before creating a content to be distributed, a key generating module 717 in the right-holder system 700 generates a signature key and a verification key under control of a controlling module 712. These keys are generated in the same way as the conventional private key and public key are generated.

Next, the key generating module 717 stores the generated signature key in a storage module 720 and, at the same time, passes the generated verification key to the controlling module 712. The controlling module 712 sends this verification key to the provider system 100 via a sending/receiving module 713. The provider system 100 receives the verification key via the sending/receiving module 116 and stores it in the storage module 120.

After the above processing, the provider system 100 sequentially sends a content to the right-holder systems 700 of all right holders, one right-holder system at a time, and sends the content returned from each right-holder system to the right-holder system 700 of the next right holder.

The controlling module 112 works with the input/output module 111 to accept a distribution content, stores it in the storage module 120, asks the encrypting module 115 to encrypt the stored content 121 using the verification key 122, which is sent from the right-holder system 700 to which the content is to be sent and which is stored in the storage module 120, and sends the encrypted content to the right-holder system 700 via the sending/receiving module 116. When the content encrypted using the verification key of the provider system 100 is returned from the right-holder system 700, the provider system 100 decrypts it using the verification key of the provider system 100, encrypts the content using the verification key of the next right-holder system 700 to which the content is to be sent, and sends it to the next right-holder system 700. When sending the content, an instruction to use an abbreviated digital signature is sent to the right-holders system 700 other than the first one.

On the other hand, the right-holder system 700 which receives the encrypted content from the provider system 100 performs the following.

The controlling module 712 tells a decrypting module 714 to decrypt the encrypted content received via the sending/receiving module 713 using the signature key stored in the storage module 720, and tells a signature generating module 715 to generate a digital signature using the signature key of the decrypted content stored in the storage module 720.

To generate the digital signature, the 160-bit hash value of the decrypted content is calculated using a predetermined one-way hash function and the resulting 160-bit hash value is encrypted using the signature key stored in the storage module 720. If an instruction to use an abbreviated digital signature is attached to the received content, an 80-bit hash value is calculated and then encrypted using the signature key stored in the storage module 720 to create a digital signature.

When the digital signature is generated, the controlling module 712 tells a signature embedding module 716 to embed the digital signature into the decrypted content inseparably according to a predetermined rule. Embedding is carried out, for example, with the digital watermark technique described in Description of Related Art. The content into which the digital signature is embedded is then returned to the provider system 100 via the sending/receiving module 713.

As a result, the final content, in which the digital signatures are embedded in the sequence as described below, is returned from the last right-holder system 700 to the provider system 100.

Let the content, D, in which the i-th right holder's signature is embedded, be represented as Fi(D). Then, the first right holder embeds the digital signature, which is the 160-bit hash value of the original content, into the content to create F1(D). The second right holder embeds the digital signature, which is the 80-bit hash value of the content in which the first right holder's digital signature is embedded, to create F2(F1(D)). This process is repeated, and the n-th right holder embeds the digital signature, which is the 80-bit hash value of the content in which the first to the (n−1)th right holder's digital signatures are embedded, into the content to create Fn (Fn−1( . . . (F2(F1(D)) . . . ).

A content to be distributed by the provider system 100 is the content returned from the last right holder. The sequentially-arranged digital signatures of all right holders are embedded in that content.

As described above, in the second embodiment, the number of bits of the hash value used by the second and the subsequent right holders is half the number of the hash value of the first right holder. This is because forging a content in which a digital signature is embedded is more difficult than forging a content in which no digital signature is embedded. Therefore, the number of bits of the hash value of digital signature of the second and the subsequent right holders may be reduced to half that of the first right holder with no effect on the security. That is, the security is maintained as if the 160-bit hash value was used for the digital signatures of all right holders.

Verification of the content in which digital signatures are embedded is carried out as in the first embodiment.

Next, the third embodiment of this invention will be described.

The third embodiment is a modification of the digital signature embedding method for right holders which was described in the second embodiment.

That is, in the third embodiment, the first right holder encrypts the content sent from the provider to generate a digital signature as in the second embodiment. However, unlike the second embodiment, the right-holder system 700 of the first right holder does not embed the digital signature in the content but returns the digital signature to the provider system 100. The provider system 100 receives the digital signature of the first right holder and sends it to the right-holder system 700 of the second right holder. The second right-holder system 700 encrypts the hash value of the first right holder's digital signature to generate a digital signature. This process is repeated for the subsequent right holders. The right-holder system 700 of the second and the subsequent right holders encrypts the hash value of the previous right holder's digital signature to generate his own digital signature.

When the provider system 100 receives the digital signature from the right-holder system 700 of the last right holder, it embeds the digital signature into the original content, for example, as a digital watermark.

Instead of embedding the digital signature, the provider system 100 may send the original content to the right-holder system 700 of the last right holder to ask it to embed the final digital signature into the content and to send it back to the provider.

Digital signature embedding may also be carried out as follows. That is, the right-holder system 700 of the first right holder embeds a digital signature, created by encrypting the hash value of the content, into the content, and sends the content to the next right-holder system 700 via the provider system 100. The right-holder systems 700 of the second and the subsequent right holders each extract the previous right holder's digital signature from the content in which the digital signature is embedded, encrypts the hash value of the extracted digital signature to create the digital signature of his own, and embeds the created digital signature into the original content received from the provider system 100. Alternatively, each of the right-holder systems 700 replaces the previous right holder's digital signature, embedded in the content, with the digital signature of his own. The right-holder system 700 then sends the content, in which his digital signature is embedded, to the next right-holder system 700 via the provider system 100.

Verification of digital signatures embedded in the content is carried out as described in Applied Cryptography, John Wilsy & Sons, Inc. (1996), pp 39–41, referenced in Description of Related Art. Note that the digital signature of the last right-holder is extracted from the content into which the digital signature was embedded.

The third embodiment of this invention is as described above.

In the second and third embodiments, the size of the hash value used for the digital signatures of the second and the subsequent right holders is half that of the digital signature used for the first right holder, or the digital signature of the second and subsequent right holders is created from the digital signature of the previous right holder. This makes it possible to embed the digital signatures of a plurality of right holders, preventing the quality of content data from being degraded. Provided that embedded information is integrated into the content inseparably, data known to the provider system 100 and right-holder system 700 may also be used instead of a digital signature based on a content-dependent hash value. For example, a digital signature based on the hash value of text data, such as a purchaser's name, may be used.

The following describe fourth to eighth embodiments. In these embodiments, the relation between digital data and an individual/organization can be authenticated and, at the same time, information on the individual/organization is presented directly to a user so that the user can authenticate the relation between digital data and the individual/organization.

In the fourth to eighth embodiments, the following is assumed: the digital data is a Web page, the individual/organization whose relation with the Web page is to be authenticated is a credit card company, and a vendor uses the logo mark of the credit card company in the Web page. Note that this is an example. Depending upon the situation, the individual/organization whose relation with the Web page is to be authenticated may be any individual/organization other than a credit card company; for example, it may be a Web page creator or any individual/organization which approves the relation with the Web page (for example, a Web page evaluation or recommendation organization). Similarly, the vendor in the example may be replaced with a Web page provider who uses the logo mark of an individual/organization whose relation with the Web page is to be authenticated.

In the fourth to eight embodiments, digital data is directly presented to the user with the use of the logo mark (image data) of an individual/organization whose relation with the digital data is to be authenticated. This presentation object may take another form that may be sensible to the user when the user uses the digital data. For example, text data, drawing data, audio data, and video data may be used. Alternatively, the presentation object need not be an object which directly represents an individual/organization whose relation with the digital data is to be authenticated; for example, a mark representing the digital data evaluation result produced by an individual/organization may be used.

First, the fourth embodiment will be described.

Figure 9:
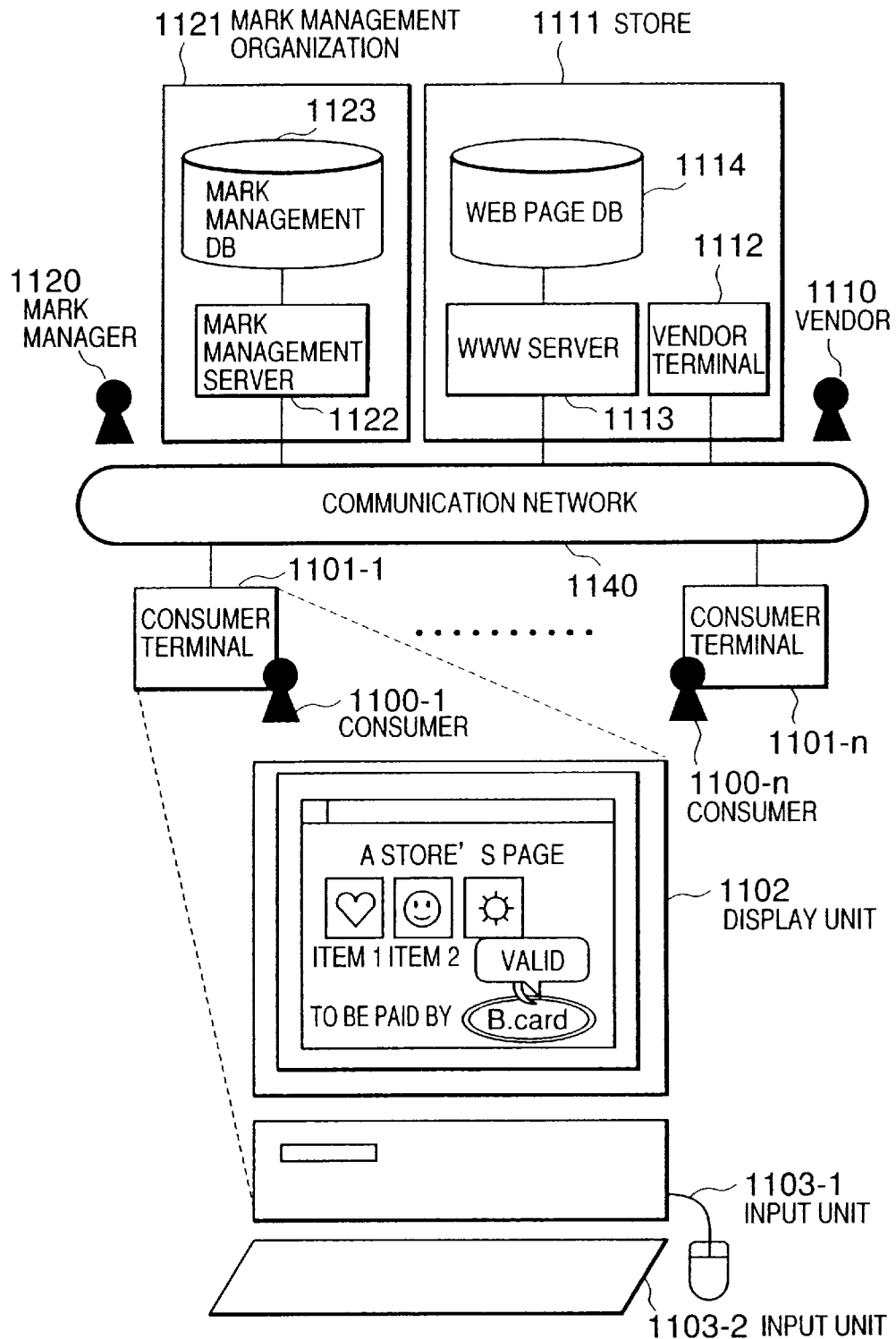
FIG. 9 is a diagram showing the outline configuration of an authentication system of a fourth embodiment of this invention.

FIG. 9 shows the configuration of an authentication system used in the fourth embodiment.

As shown in the figure, the authentication system is used by a plurality of consumers 1100-1 to 1100-n (hereafter, also called consumer 1100) who buy goods, a vendor 1110 who sells goods, and a mark manager 1120 who manages various types of mark. As shown in FIG. 9, a plurality of consumer terminals 1101-1 to 1101-n (hereafter, also called a consumer terminal 1101), a vendor terminal 1112, a WWW server 1113, and a mark management server 1122 are interconnected via a communication network 1140 such as the Internet. The mark manager 1120 is an authentic organization available for use by all mark owners (such as vendor 1110) in this system. Note that the mark owner may also act as the mark manager 1120. In this case, the vendor terminal 1112, WWW server 1113, and mark management server 1122 may share the same machine.

The consumer terminal 1101 is a terminal used by the consumer 1100. The consumer terminal 1101 has a display unit 1102 on which document data or image data is presented to the consumer 1100 and an input unit 1103-1 or 1103-2 (hereafter, also simply called an input unit 1103) through which the consumer 1100 enters data and instructions. The consumer 1100 transfers data to or from the vendor 1110 or the mark manager 1120 via the consumer terminal 1101 and communication network 1140.

The vendor terminal 1112 is a terminal used by the vendor 1110. The vendor 1110 uses the vendor terminal 1112 to create a Web page of a store 1111 that is managed by the vendor or to transfer data to or from the mark manager 1120.

The WWW server 1113, which is a server on which a later-described WWW server program 1407b runs, sends a Web page stored in a Web page DB 1114 when accessed by a later-described browser program 1204b via the consumer terminal 1101. The Web page which is sent is displayed on the display unit 1102 on the consumer terminal 1101.

The mark management server 1122 sends a mark upon request from the vendor 1110. In addition, upon request from the consumer 1100, the server 1112 checks the validity of the mark (that is, checks if the mark was sent from the mark management server 1122 to the vendor 1110 before the request was received) and sends the result back to the consumer 1100.

Next, the consumer terminal 1101, the WWW server 1113, and the mark management server 1122, which are comprised in the authentication system of the fourth embodiment, are described.

Figure 10:
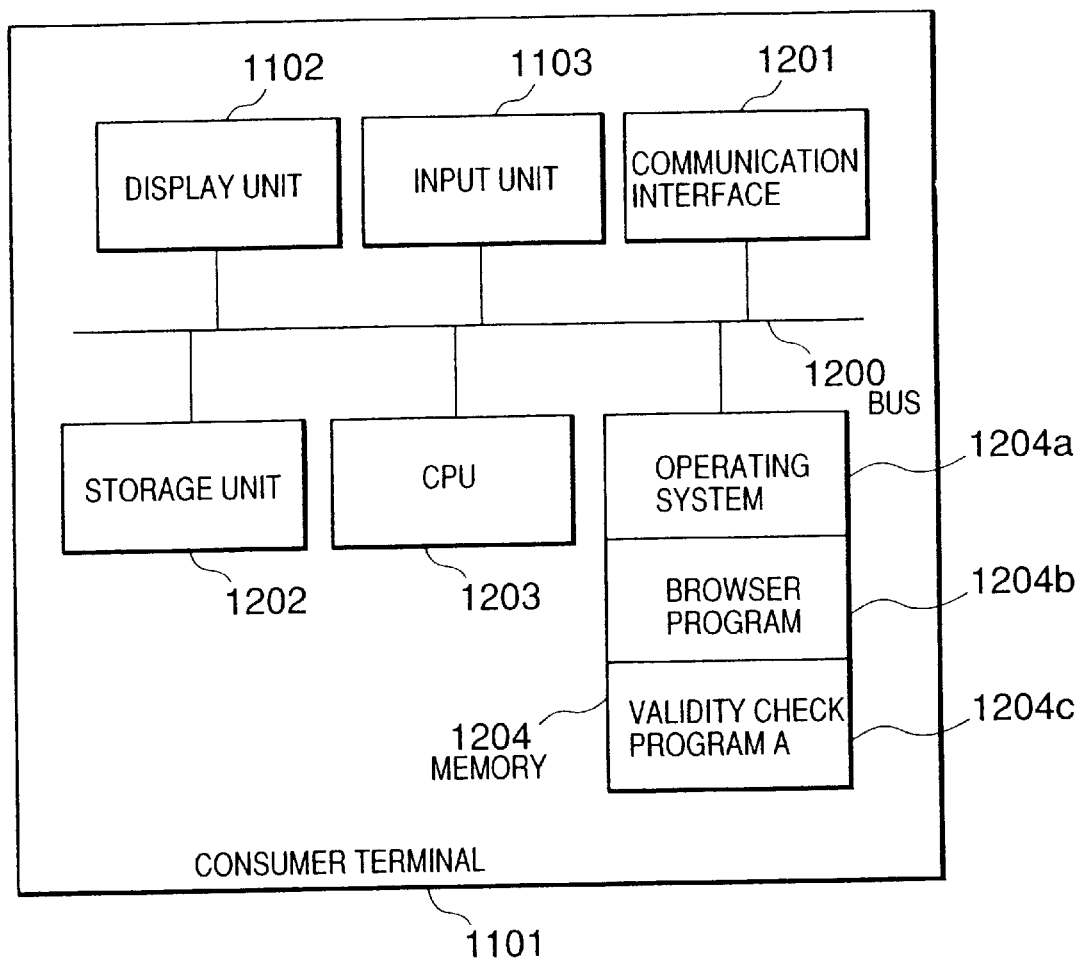
FIG. 10 is a block diagram showing the hardware configuration of a consumer terminal used in the fourth embodiment of this invention.

FIG. 10 shows the hardware configuration of the consumer terminal 1101.

As shown in FIG. 10, the consumer terminal 1101 used in the forth embodiment comprises the display unit 1102, the input unit 1103, a communication interface 1201, a storage unit 1202, a central processing unit (CPU) 1203, and a temporary storage unit (memory) 1204, all interconnected by a bus 1200.

The display unit 1102, used to display messages for the consumer 1100 who uses the consumer terminal 1101, is composed of a CRT, a liquid crystal display, and so forth.

The input unit 1103, used by the consumer 1100 on the consumer terminal 1101 to enter data or instructions, is composed of a keyboard, mouse, and so forth.

The communication interface 1201 is an interface through which data is transferred to or from the WWW server 1113 or mark management server 1122 via the communication network 1140.

The storage unit 1202, usually a hard disk unit or floppy disk unit, permanently stores the programs and data to be used by the consumer terminal 1101.

The CPU 1203 integrally controls the components of the consumer terminal 1101 and performs various types of operation.

The memory 1204 temporarily contains the programs used by the CPU 1203 to perform the above processing. These programs include an operating system 1204a (hereafter also called OS 1204a), the browser program 1204b, and a validity check program A 1204c.

The OS 1204a performs the file management, process management, or device management functions for all consumer terminals 1101.

The browser program 1204b allows the consumer terminal 1101 to communication with the WWW server 1113 to download Web pages from the Web page DB 1114.

The validity check program A 1204c allows the consumer terminal 1101 to communicate with the mark management server 1122 to check the validity of the mark attached to the Web page downloaded from the WWW server 1113.

Figure 11:
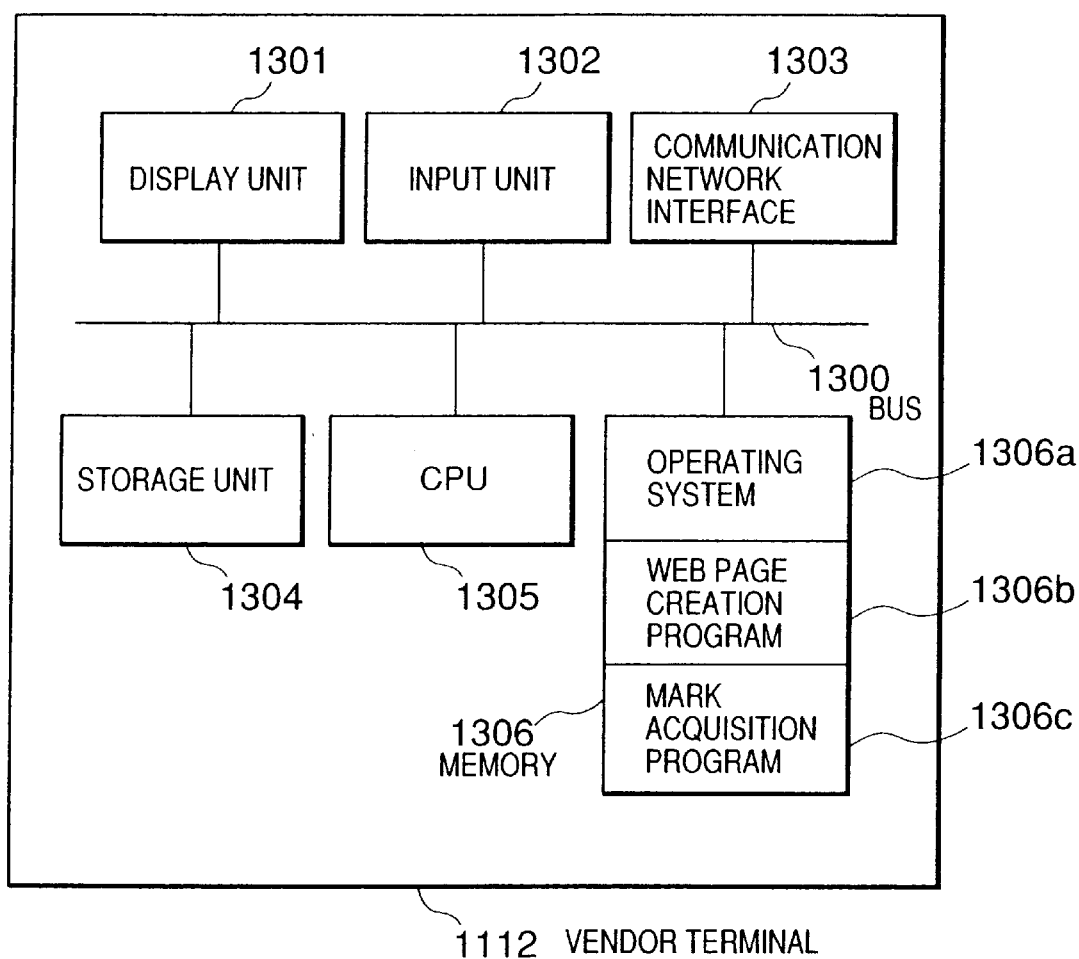
FIG. 11 is a block diagram showing the hardware configuration of a vendor terminal used in the fourth embodiment of this invention.

FIG. 11 shows the hardware configuration of the vendor terminal 1112.

As shown in FIG. 11, the vendor terminal 1112 used in the fourth embodiment comprises a display unit 1301, an input unit 1302, a communication network interface 1303, a storage unit 1304, a central processing unit (CPU) 1305, and a temporary storage unit (memory) 1306, all interconnected by a bus 1300.

The display unit 1301, used to display messages for the vendor 1110 who uses the vendor terminal 1112, is composed of a CRT, a liquid crystal display, and so forth.

The input unit 1302, used by the vendor 1110 on the vendor terminal 1112 to enter data or instructions, is composed of a keyboard, mouse, and so forth.

The communication interface 1303 is an interface through which data is transferred to or from the WWW server 1113 or mark management server 1122 via the communication network 1140.

The storage unit 1304, usually a hard disk unit or floppy disk unit, permanently stores the programs and data to be used by the vendor terminal 1112.

The CPU 1305 integrally controls the components of the vendor terminal 1112 and performs various types of operation.

The memory 1306 temporarily contains the programs used by the CPU 1305 to perform the above processing. These programs include an OS 1306a, a Web page creation program 1306b, and mark acquisition program 1306c.

The OS 1306a performs the file management, process management, or device management functions for the whole vendor terminal 1112.

A Web page creation program 1306b communicates with the WWW server 1113 when the vendor 1110 creates a Web page and stores the created Web page in the Web page DB 1114.

A mark acquisition program 1306c allows the vendor terminal 1112 to communicate with the mark management server 1122 to acquire a mark to be pasted into a Web page.

Figure 12:
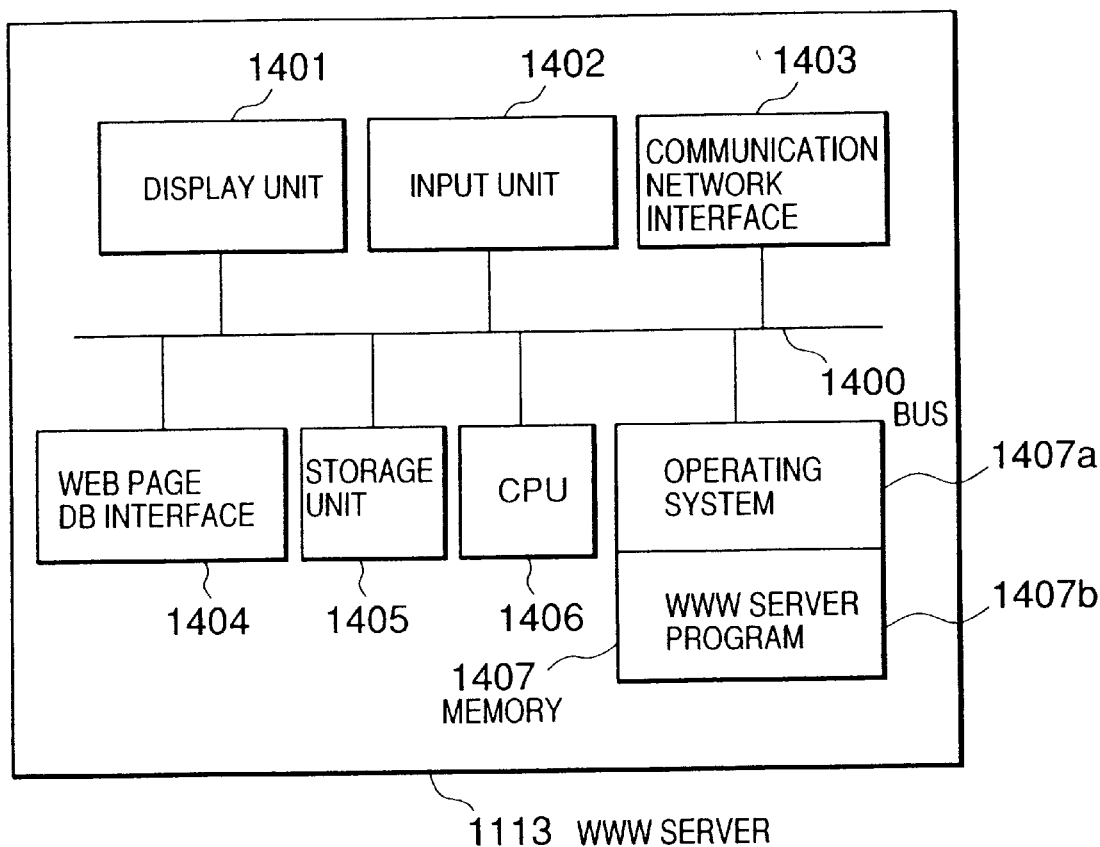
FIG. 12 is a block diagram showing the hardware configuration of a WWW server used in the fourth embodiment of this invention.

FIG. 12 shows the hardware configuration of the WWW server 1113.

As shown in FIG. 12, the WWW server 1113 used in the fourth embodiment comprises a display unit 1401, an input unit 1402, a communication network interface 1403, a Web page DB interface 1404, a storage unit 1405, a central processing unit (CPU) 1406, and a temporary storage unit (memory) 1407, all interconnected by a bus 1400.

The display unit 1401, used to display messages for the vendor 1110 who uses the WWW server 1113, is composed of a CRT, a liquid crystal display, and so forth.

The input unit 1402, used by the vendor 1110 on the WWW server 1113 to enter data or instructions, is composed of a keyboard, mouse, and so forth.

The communication interface 1403 is an interface through which data is transferred to or from the consumer terminal 1101 or vendor terminal 1112 via the communication network 1140.

The Web page DB interface 1404 is an interface through which data is transferred to or from the Web page DB 1114.

The storage unit 1405, usually a hard disk unit or a floppy disk unit, permanently stores the programs and data to be used by the WWW server 1113.

The CPU 1406 integrally controls the components of the WWW server 1113 and performs various types of operation.

The memory 1407 temporarily contains the programs used by the CPU 1406 to perform the above processing. These programs include an OS 1407a and a WWW server program 1407b.

The OS 1407a performs the file management, process management, or device management functions to control the whole WWW server 1113.

The WWW server program 1407b communicate with the vendor terminal 1112 and stores received Web pages in the Web page DB 1114. It also sends Web pages from the Web page DB 1114 when a request is issued from the browser program 1204b running on the consumer terminal 1101.

Figure 13:
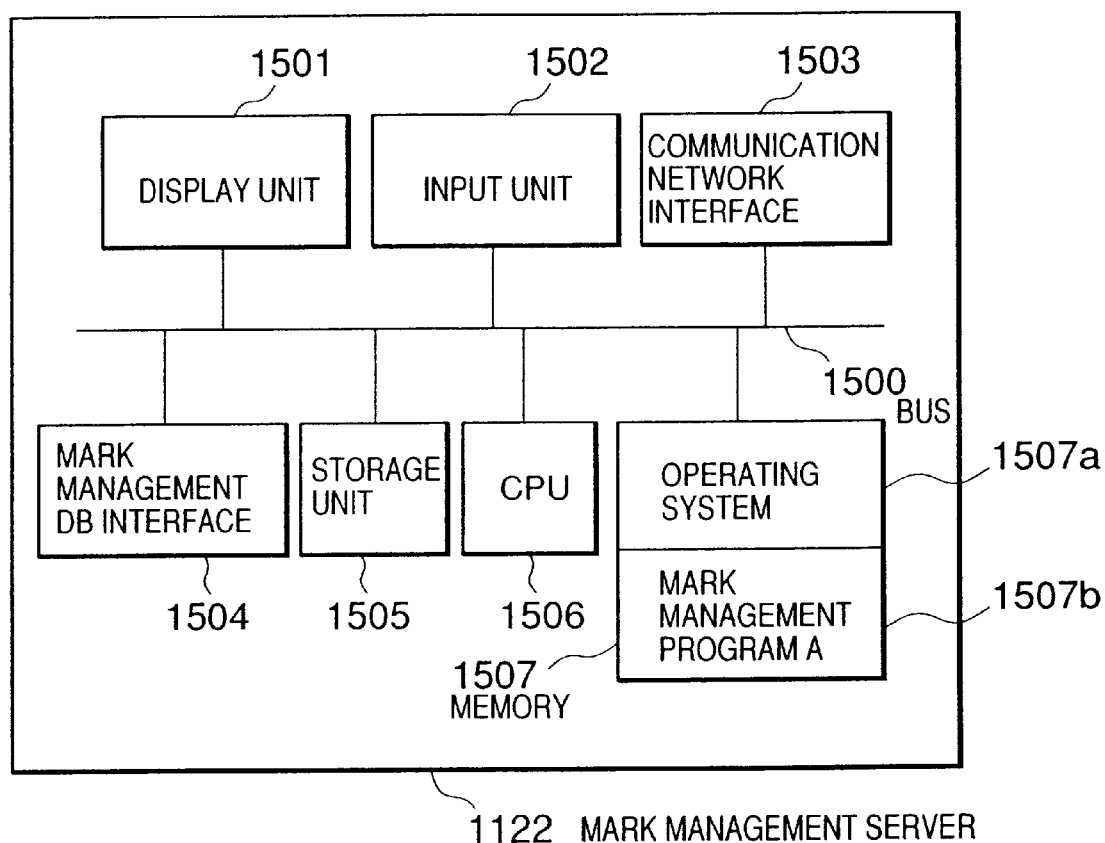
FIG. 13 is a block diagram showing the hardware configuration of a management server used in the fourth embodiment of this invention.

FIG. 13 shows the hardware configuration of the mark management server 1122.

As shown in FIG. 13, the mark management server 1122 used in the fourth embodiment comprises a display unit 1501, an input unit 1502, a communication network interface 1503, a mark management DB interface 1504, a storage unit 1505, a central processing unit (CPU) 1506, and a temporary storage unit (memory) 1507, all interconnected by a bus 1500.

The display unit 1501, used to display messages for the mark manager 1120 who uses the mark management server 1122, is composed of a CRT, a liquid crystal display, and so forth.

The input unit 1502, used by the mark manager 1120 on the mark management server 1122 to enter data or instructions, is composed of a keyboard, mouse, and so forth.

The communication interface 1503 is an interface through which data is transferred to or from the consumer terminal 1101 or vendor terminal 1112 via the communication network 1140.

The mark management DB interface 1504 is an interface through which data is transferred to or from a mark management DB 1123. The mark management DB 1123 is used for mark management and contains data on mark types, mark expiration periods, vendor ID information, URLs of vendor's Web pages, and so forth in such a format as is shown in FIG. 15. It is apparent in FIG. 15 that, when no expiration period is provided for marks or when the mark manager 1120 issues only one type of mark, the corresponding items (expiration period and mark type) need not be managed.

The storage unit 1505, usually a hard disk unit or a floppy disk unit, permanently stores the programs and data to be used by the mark management server 1122.

The CPU 1506 integrally controls the components of the mark management server 1122 and performs various types of operation.

The memory 1507 temporarily contains the programs used by the CPU 1506 to perform the above processing. These programs include an OS 1507a and a mark management program A 1507b.

The OS 1507a performs the file management, process management, or device management functions to control the whole mark management server 1122.

Upon receiving a mark-send request from the vendor terminal 1112, the mark management program A 1507b checks the vendor 1110 to see if a mark is to be sent and, if the mark is to be sent, sends the mark managed in the mark management DB 1123 to the vendor 1110. When the consumer terminal 1101 sends a mark validity check request, the mark management program A 1507b references the mark management DB 1123 to check the validity of the mark and returns the result.

Next, the operation of the authentication system used in the fourth embodiment will be explained.

Figure 14:
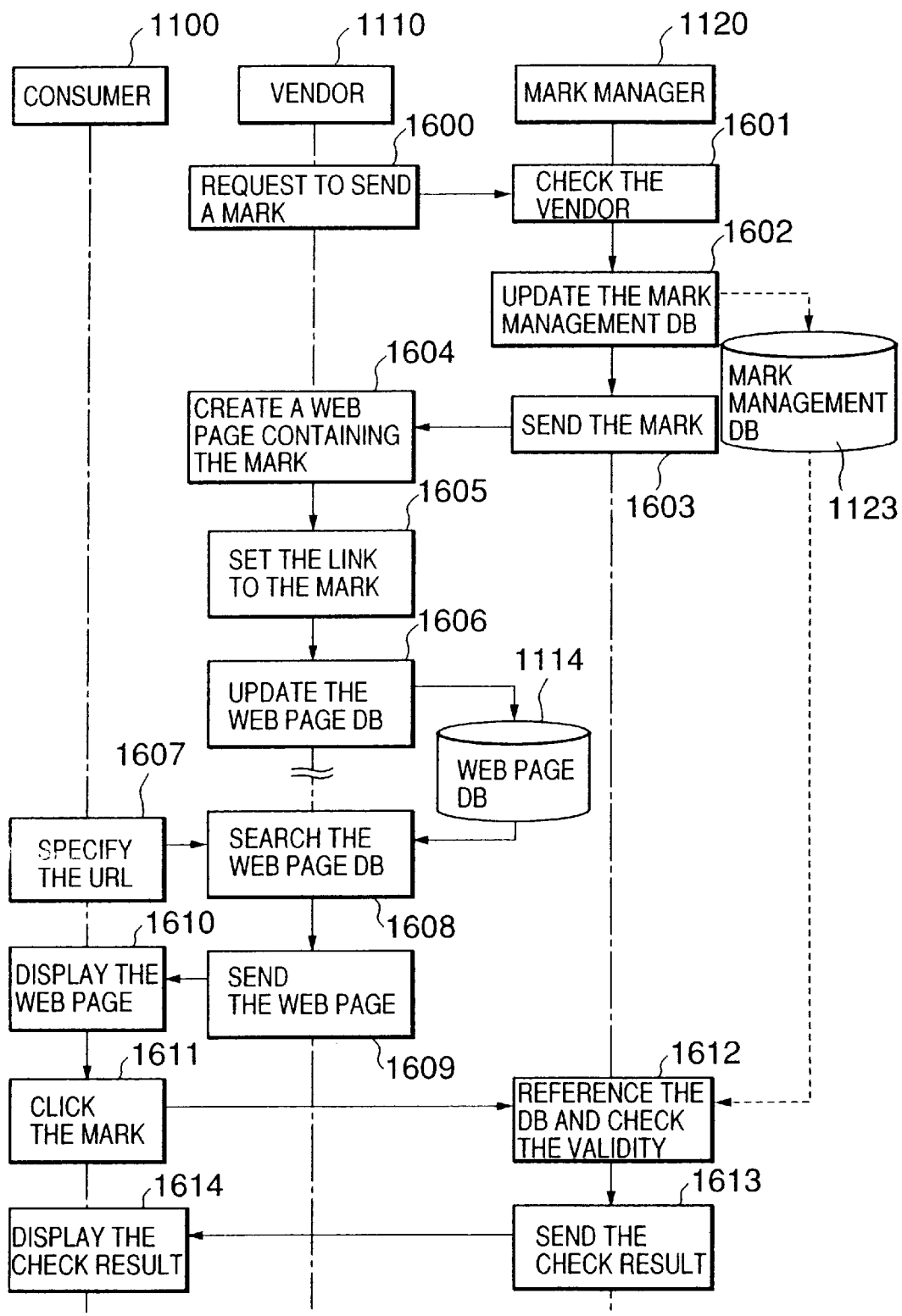
FIG. 14 is a flowchart showing the operation of the authentication system used in the fourth embodiment of this invention.

FIG. 14 shows a series of operations that are performed when the vendor 1110 receives a mark from the mark manager 1120, the vendor 1110 pastes the mark in the Web page for publication, and then the consumer 1100 browses the Web page and checks the validity of the Web page. The figure shows the operation of each person: consumer 1100, vendor 1110, and mark manager 1120.

In FIG. 14, the consumer 1100 uses the consumer terminal 1101, and the vendor 1110 uses the vendor terminal 1112 and the WWW server 1113. The mark manager 1120 uses the mark management server 1122.

First, the vendor 1110 sends a mark-send request, specifying the URL of his own Web page and a mark type, to the mark manager 1120 (step 1600).

Upon receiving the request, the mark manager 1120 determines whether or not the mark specified by the mark type requested by the request is to be sent to the vendor 1110 (step 1601) and, if the mark manager 1120 determines to do so, updates the mark management DB 1123 (step 1602) and sends the mark to the vendor 1110 (step 1603). If the mark manager 1120 determines not to do so, he sends the message stating this fact to the vendor 1110. In the fourth embodiment, whether or not to send the mark depends on whether the vendor 1110 has a right to get the mark, that is whether the store of the vendor 1110 is an agent of the credit card company corresponding to the requested logo mark. Depending upon the situation in which the mark is used, other criteria may be used.

When the vendor 1110 receives the mark, he creates a Web page in which the mark is pasted (step 1604), sets in the mark the link to the mark manager 1120 (step 1605), and stores the Web page in the Web page DB 1114 for access by the consumer 1100 (step 1606).

Next, the consumer 1100 sends a Web page send request, including the URL of the above-described Web page, to the vendor 1110. (step 1607)

Upon receiving the request, the vendor 1110 searches the Web page DB 1114 for the Web page corresponding to the requested URL (step 1608) and returns it to the consumer 1100 (step 1609).

Upon receiving the Web page, the consumer 1100 displays it (step 1610) and then clicks the mark pasted on the displayed Web page (step 1611) in order to send the validity check request, including the URL of the Web page, to the mark manager 1120 (step 1611). If, at that time, the validity check request cannot be sent to the mark manager 1120 because link to the mark manager 1120 is not specified for the mark, the consumer 1100 determines that the validity of the mark cannot be confirmed (i.e., the mark is invalid) and ends processing.

When the mark manager 1120 receives the request, he searches the mark management DB 1123 to check if the mark has already been sent to the vendor 1110 specified by the URL in the request and, if the mark has already been sent, checks that the mark has not yet expired (step 1612). The mark manager 1120 then sends one of the following three results to the consumer 1100 (step 1613): <1> The mark has not yet been issued to the vendor 1110 specified by the URL; <2> The mark has already been issued to the vendor 1110 specified by the URL but has already expired; <3> The mark has already been issued to the vendor 1110 specified by the URL and the mark has not yet expired.

Finally, processing ends when the consumer 1100 confirms the above result (step 1614).

In the above procedure, the validity check result information is sent to the consumer 1100 in the form of the balloon message, saying "valid", displayed on the display unit 1102 as shown in FIG. 9 (or "Invalid", "Expired", "Link invalid"). Other display methods may be used. Sounds may be used, or sounds and display messages may be combined.

In the fourth embodiment, the mark manager 1120 sends a mark to only the vendor 1110 which is eligible to receive the mark, with the mark related information (ID of the vendor 1110 to which the mark was sent, URL of the Web page, expiration status of the mark) managed in the mark management DB 1123. In addition, the mark manager 1120 references the mark management DB 1123 to check if the mark has already been sent to the vendor 1110 specified by the URL included in the validity check request that was sent from the consumer 1100. If the mark has already been sent, the mark manager checks that the mark has not expired and informs the consumer 1100 of the result.

The consumer 1100 uses the link information stored in the mark pasted in the Web page to contact the mark manager 1120 and to confirm the validity of the mark. If the link to the mark manager 1120 is not set up correctly and therefore the validity check request cannot be sent to the mark manager 1120, the consumer 1100 determines that the mark is not validated (invalid mark).

Therefore, in the fourth embodiment, if an illegal vendor copies the mark from the Web page of a legal vendor into his own Web page, the validity of the mark cannot be checked during the validity check because the mark management DB 1123 managed by the mark manager does not contain a record indicating that the mark was sent to the Web page of the illegal user. As a result, the consumer 1100 who browses the vendor's Web page can check the validity of the information indicated by the mark pasted in the Web page.

In the fourth embodiment, the validity check is triggered by the consumer 1100 clicking on the mark. The embodiment may be modified so that the validity check is triggered automatically when the Web page is received. It may also be modified so that the Web page is displayed when the mark is validated.

In the description of the fourth embodiment, the vendor terminal 1112 and the WWW server 1113 are separate machines. However, they may be the same machine.

The fifth embodiment will be described below.

Figure 16:
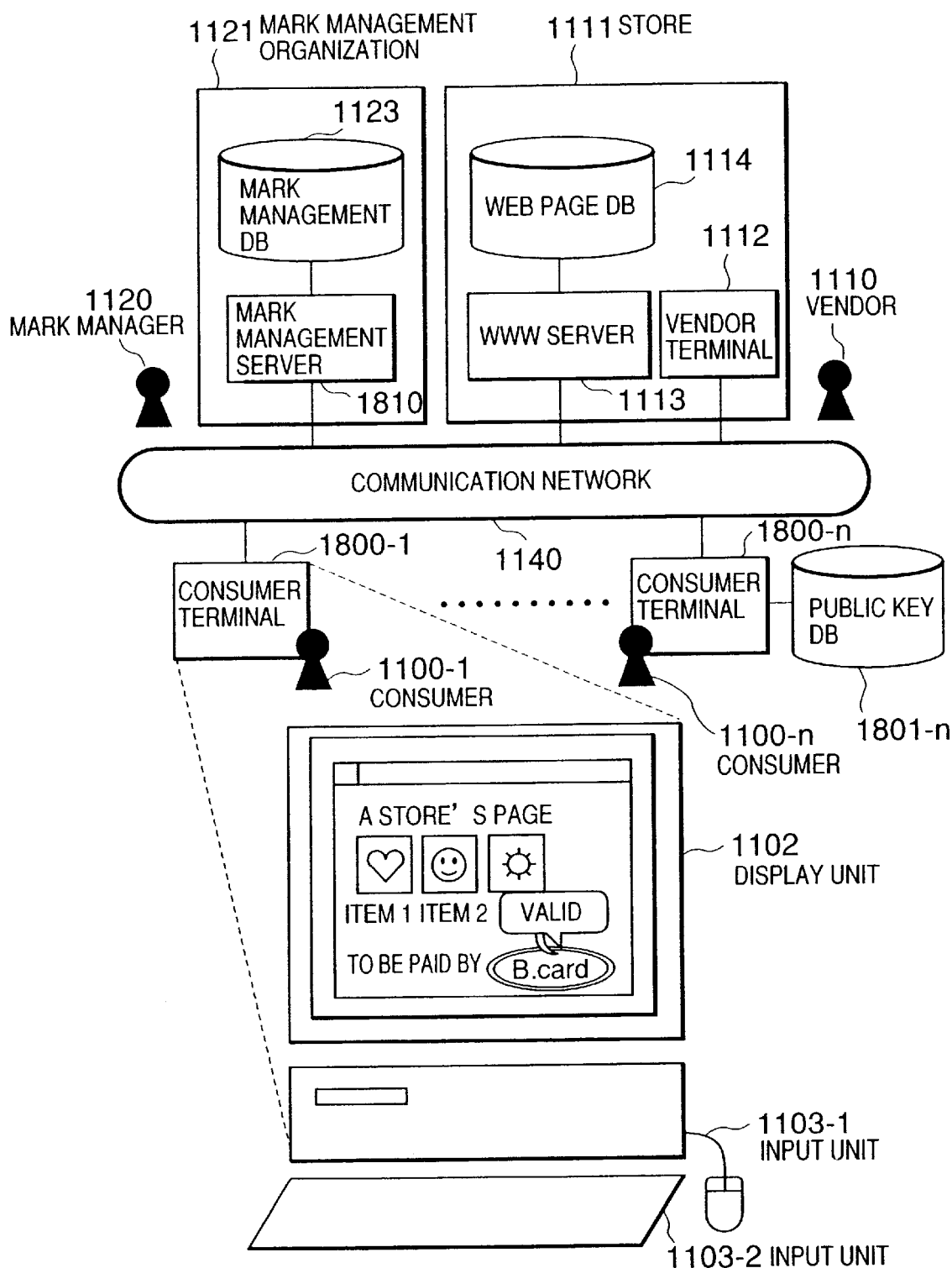
FIG. 16 is a block diagram showing the outline configuration of an authentication system used in the fifth embodiment of this invention.

FIG. 16 shows the configuration of an authentication system used in the fifth embodiment.

The configuration of the authentication system used in the fifth embodiment is basically the same as that shown in FIG. 9, except that public keys DB 1801-1 to 1801-$n$ (hereafter called public key DB 1801) are each connected to consumer terminals 1800-1 to 1800-$n$ (hereafter called consumer terminal 1800).

The public key DB 1801, like the one shown in FIG. 20, is used for management of the pubic keys of mark manager 1120. These public keys are used for verifying digital signatures (hereafter also called signature) generated by mark manager 1120.

Figure 17:
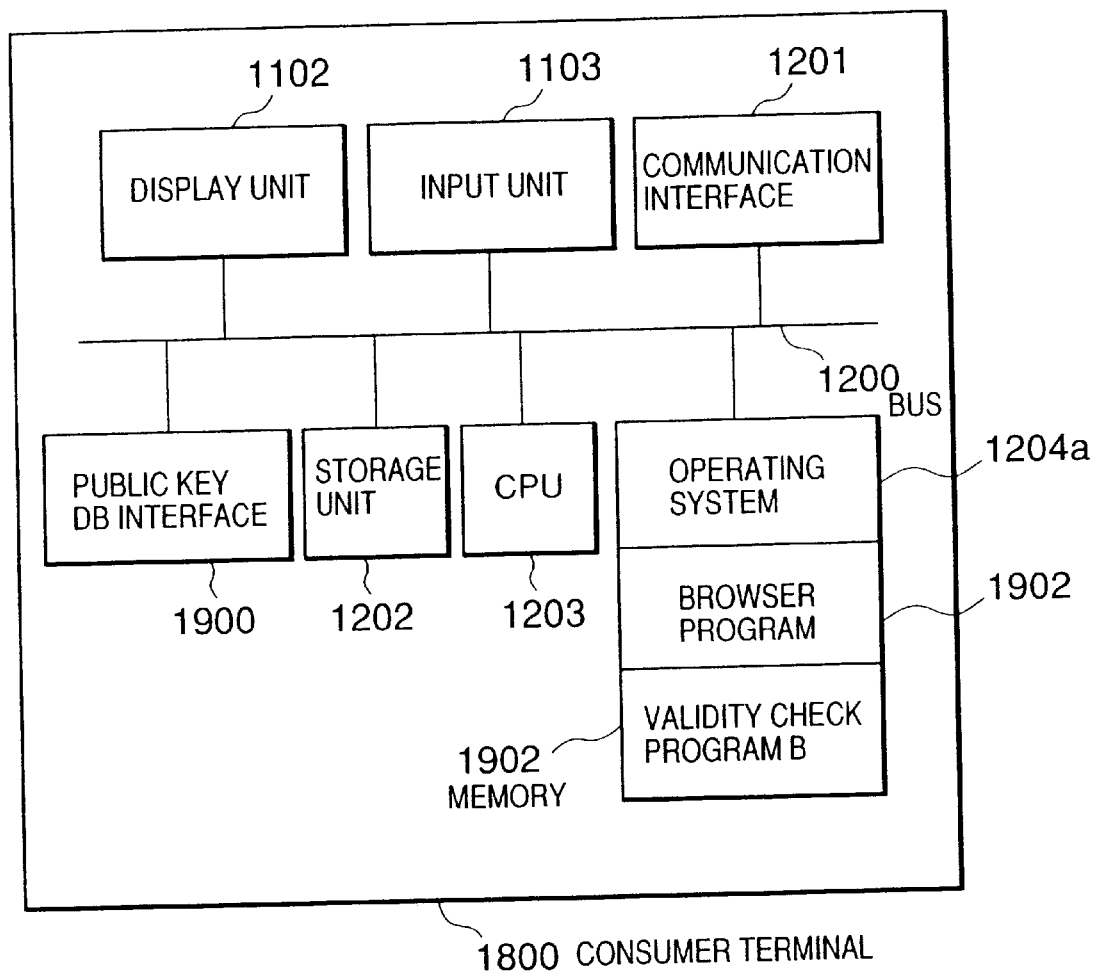
FIG. 17 is a block diagram showing the hardware configuration of a consumer terminal used in the fifth embodiment of this invention.

FIG. 17 shows the hardware configuration of the consumer terminal 1800 used in the fifth embodiment.

The hardware configuration of the consumer terminal 1800 used in the fifth embodiment is basically the same as that shown in FIG. 10, except that a public key DB interface 1900 is provided and that a validity check program B 1902 is stored in and run from a memory 1901.

The public key DB interface 1900 is an interface via which data is transferred to or from the public key DB 1801. The validity check program B 1902 communicates with a mark management server 1810 to get the public key of the mark manager 1120 and to validate the mark containing the signature pasted in the Web page downloaded from the WWW server 1113.

Figure 18:
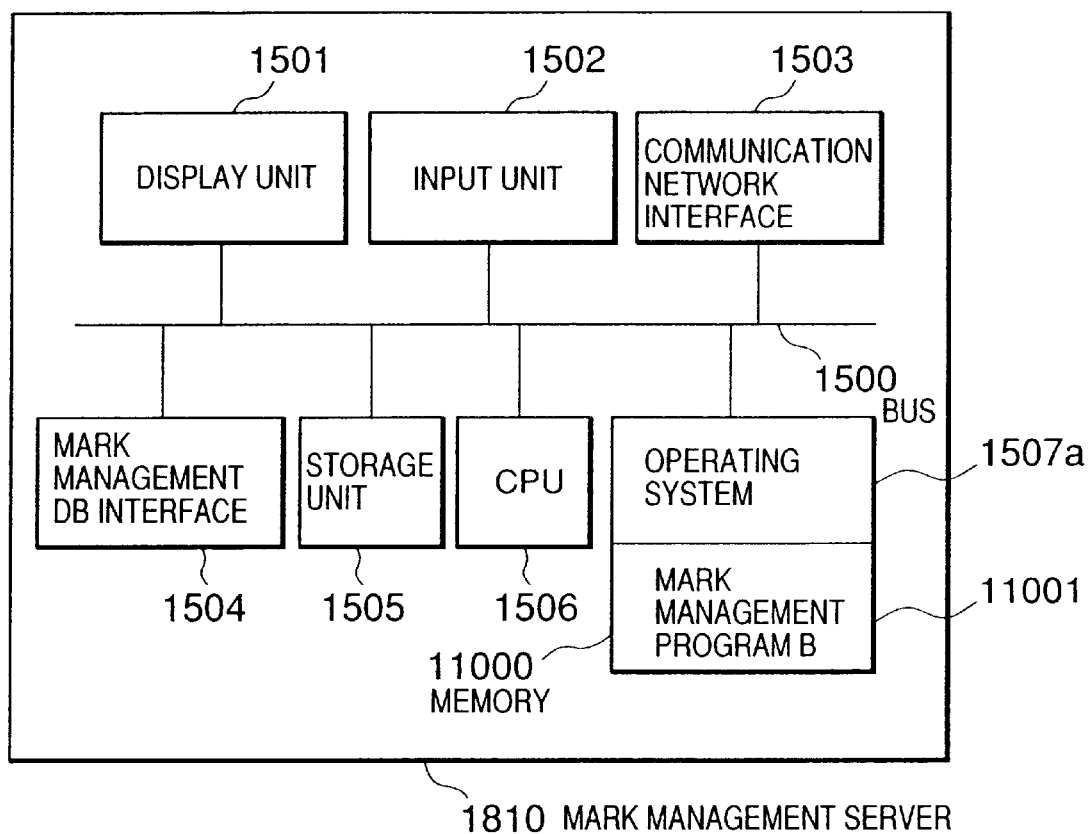
FIG. 18 is a block diagram showing the hardware configuration of a mark management server used in the fifth embodiment of this invention.

FIG. 18 shows the hardware configuration of the mark management server 1810 used in this embodiment.

The hardware configuration of the mark management server 1810 used in the fifth embodiment is basically the same as that shown in FIG. 13, except that a validity check program B 11001 is stored in and run from a memory 11000.

The validity check program B 11001 performs the following two operations: (1) when a public key send-request is received from the consumer terminal 1800, the program sends the public key. (2) when a mark send-request is received from the vendor terminal 1112, the program checks the vendor 1110 to see if the mark should be sent and, if the mark should be sent, creates a digital signature by using the private key for the data indicating the URL of the Web page of the vendor 1110, creates a signature-containing mark by combining the digital signature with the mark managed in the mark management DB 1123, and then sends the signature-containing mark to the vendor 1110. The digital signature may be combined with the mark means, for example, by embedding the digital signature, in the form of a digital watermark, into the mark using the above-described digital watermark technique. The digital watermark technique allows information to be embedded with little change on the image data. The digital watermark technique may be used to embed information into a mark because it is one type of image data. Because there are several types of digital watermark (for example, for color images, monochrome images, or binary images), information may be embedded into various types of mark. Another method, if available, may also be used to embed information into the mark. Note that when a digital watermark is used, the mark may be deformed a little provided the mark can be appropriately identified (the logo mark of each credit company may be uniquely identified).

Public key cipher system used for signatures include a system using prime factorizing or an ellipse curve.

Next, the operation of the authentication system used in the fifth embodiment will be described.

Figure 19:
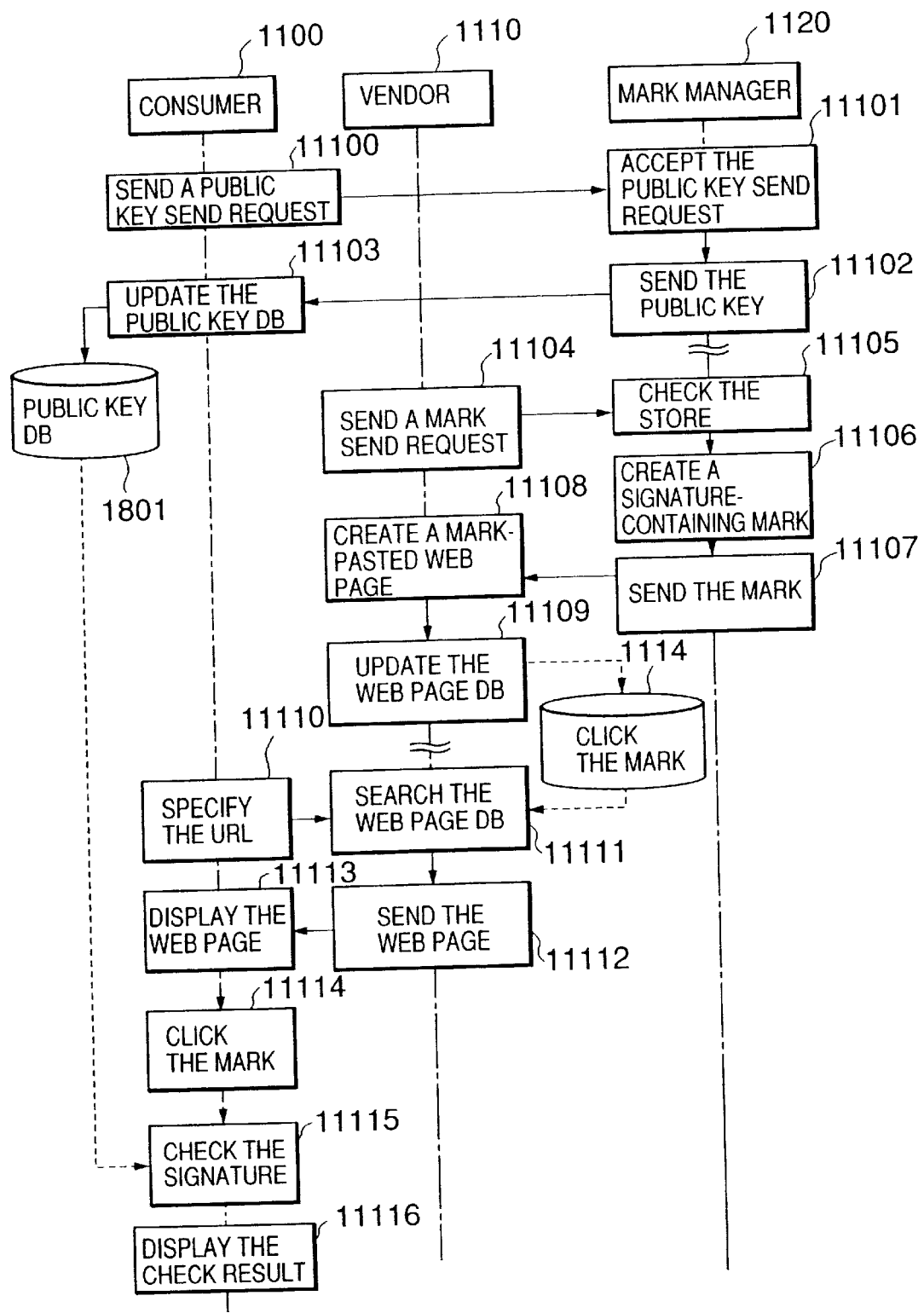
FIG. 19 is a flowchart showing the operation of the authentication system used in the fifth embodiment of this invention.

FIG. 19 shows a series of operations that is performed in this embodiment. In the series of operations, the consumer 1100 gets the public key of the mark manager 1120, the vendor 1110 receives a mark from the mark manager 1120 and pastes the mark in the Web page for publication, and then the consumer 1100 browses the Web page and checks the validity of the Web page. The figure shows the operation of each person: consumer 1100, vendor 1110, and mark manager 1120.

In FIG. 19, the consumer 1100 uses the consumer terminal 1800, the vendor 1110 uses the vendor terminal 1112 and the WWW server 1113, and the mark manager 1120 uses the mark management server 1810.

First, the consumer 1100 sends a public key send request to the mark manager 1120 (step 11100).

Upon receiving the request, the mark manager 1120 (step 11101) returns his own public key to the consumer 1100 (step 11102).

The consumer 1100, who receives the public key from the mark manager 1120, stores the public key in the public key DB 1801 (step 11103).

Next, the vendor 1110 sends a mark-send request, specifying the URL of his own Web page and a mark type, to the mark manager 1120 (step 11104).

Upon receiving the request, the mark manager 1120 determines whether or not the mark specified by the mark type contained in the request is to be sent to the vendor 1110 (step 11105) and, if the mark manager 1120 determines to do so, he generates a signature using the URL data specified by the request and the private key, and combines the generated signature with the mark specified by the mark type to generate a signature-containing mark (step 11106). The mark manager 1120 then sends the generated signature-containing mark to the vendor 1110. (step 11107). If the mark manager 1120 determines not to send the mark, he sends the message stating this fact to the vendor 1110. In this embodiment, whether or not the mark to be sent depends on whether the vendor 1110 has a right to obtain the mark, that is whether the store is an agent of the credit card company corresponding to the requested logo mark, as in the fourth embodiment. Depending upon the situation in which the mark is used, other criteria may be used.

When the vendor 1110 receives the mark, he creates a Web page in which the signature-containing mark is pasted (step 11108), and stores the Web page in the Web page DB 1114 for access by the consumer 1100 (step 11109).

Next, the consumer 1100 sends a Web page send request, including the URL of the above-described Web page, to the vendor 1110 (step 11110).

Upon receiving the request, the vendor 1110 searches the Web page DB 1114 for the Web page corresponding to the requested URL (step 11111) and returns it to the consumer 1100 (step 11112).

Upon receiving the Web page, the consumer 1100 displays it (step 11113) and then clicks on the signature-containing mark pasted on the displayed Web page (step 11114) in order to verify the signature contained in the signature-containing mark using the public key of the mark manager 1120 stored in the public key DB 1801 and the URL data of the Web page (step 11115). Depending upon whether the signature is correctly verified, the consumer 1100 checks the validity of the signature-containing mark and ends processing (step 11116).

In the above procedure, the validity check result information is sent to the consumer 1100 in the form of the balloon message, saying "Valid", displayed on the display unit 1102 as shown in FIG. 16 (or "Invalid", "Necessary public key missing"). Other display methods may be used. Sounds may be used, or sounds and display messages may be combined.

In the above fifth embodiment, the mark manager 1120 sends the signature-containing mark only to the vendor 1110 who is eligible to accept the signature-containing mark. The URL of the Web page of the vendor 1110 is used as an element for generating the signature-containing mark.

The consumer 1100 verifies the signature contained in the signature-containing mark pasted in the Web page using the public key of the mark manager 1120 and the URL data of the Web page.

Therefore, when an illegal user copies a signature-containing mark from the Web page of an agent and pastes it into his own Web page, the URL of the Web page of the illegal user does not match the URL contained in the signature and so the mark cannot be validated during validity check processing. As a result, the consumer 1100 browsing the Web page of the vendor 1110 can validate the information indicated by the mark pasted in the Web page.

In the fifth embodiment, the validity check is triggered by the consumer 1100 clicking the mark. As in the fourth embodiment, this embodiment may be modified so that the validity check is triggered automatically when the Web page is received. It may also be modified so that the Web page is displayed when the mark is validated.

In this embodiment, the vendor 1110 gets the mark and then the consumer 1100 gets the public key. This sequence may be reversed. However, when the consumer 1100 gets the public key before accessing the Web page in step 11110 as in the fifth embodiment, the public key need not be obtained each time the Web page is accessed.

In the description of the fifth embodiment, the vendor terminal 1112 and the WWW server 1113 are separate machines. However, they may be the same machine.

In the fifth embodiment, a signature is created only for the URL data of the Web page. The signature may also be created for the image data used as a mark. This prevents the vendor 1110 from creating a mark containing a forged signature by retrieving only the signature from the signature-containing mark received from the mark manager 1120 and combining the retrieved signature with the mark of some other credit card company, thus ensuring safety. In addition, the vendor 1110 may previously create a Web page in which the mark is to be pasted and may send the Web page to the mark manager 1120 with a mark send request so that the digital signature is created for the Web page. This prevents the signature-containing mark from being pasted on the other Web page. That is, the signature-containing mark can be used for presenting the contents of the Web page. Therefore, this modification is suitable for a system in which the contents of a Web page must be guaranteed by some authentic person.

In addition, a signature and a mark are combined into a signature-containing mark in the fifth embodiment. The embodiment may be modified so that the vendor 1110 may previously create a Web page into which the mark is to be pasted and may send the created Web page to the mark manager 1120 with the mark-send request. In this case, the mark manager 1120 may add filtering data, created based on the Web page contents, to the signature-containing mark as the attribute information.

This allows only some specific Web pages to be filtered for display. For example, only the Web pages in which recommendation marks issued by some Web page evaluation organization are pasted and which are valid may be filtered. To do so, a filtering program must be installed on the consumer terminal 1101 in advance. This program has the filtering setup function which allows the consumer 1100 to specify the type of mark to be displayed on the display unit 1102 of the consumer terminal 1101 and the filtering execution function which allows the consumer 1100 to specify not to display the other marks. This may also be applied to a system through which the user can filter out Web pages not to be presented to children because they include violent scenes.

The programs stored in the terminals and servers used in the fourth and fifth embodiments usually run under control of the operating system controlling the unit and, through the operating system, transfer data and command to and from the hardware components of the unit. Of course, the programs may transfer data and command with the hardware components directly, not via the operating system.

As described above, in the fourth and fifth embodiments, a user who browses a Web page can correctly validate information indicated by image data pasted in the Web page.

A sixth embodiment of this invention will now be described.

The configuration of an authentication system used in the sixth embodiment is basically the same as that of the authentication system explained in the fourth embodiment (FIG. 9 to FIG. 13) except that the validity check program A 1204c in the memory 1204 of the consumer terminal 1101 is replaced by the validity check program C, that the mark management program A 1507b in the memory 1507 of the mark management server 1122 is replaced by the mark management program C, and that the mark acquisition program in the memory 1306 of the vendor terminal 1112 is replaced by the mark acquisition program C.

The operation of the authentication system used in the sixth embodiment will be described below.

First, the mark acquisition program C running on the vendor terminal 1112 sends a mark-send request, as well as his own Web page data, to the mark management server 1122.

Figure 21:
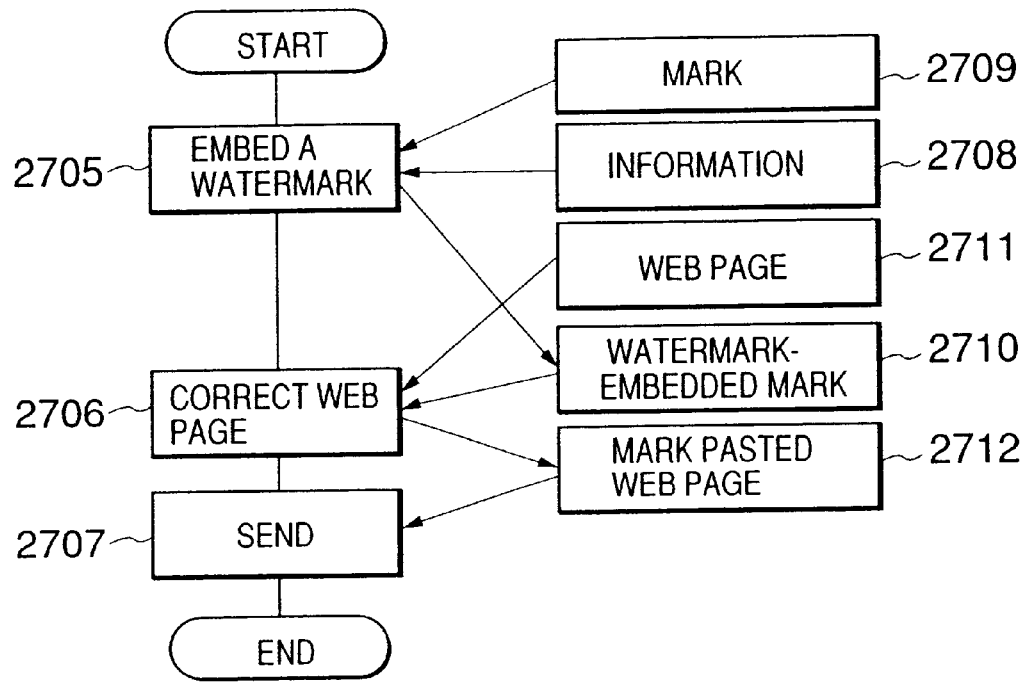
FIG. 21 is a flowchart showing the operation of a mark management server used in a sixth embodiment of this invention.

Upon receiving the request, the mark management program C running on the mark management server 1122 checks if a mark should be sent to the vendor 1110 on the vendor terminal 1112 from which the request was sent and, if it is determined that the mark should be sent, performs processing shown in FIG. 21.

That is, the server 1122 reads a mark 2709 and a predetermined information 2708 to be embedded into the mark 2709 (for example, text to be presented to a mark management organization 1121) from the mark management DB 1123 and embeds the predetermined information 2708 into the mark 2709 as a digital watermark (step 2705). The server 1122 then modifies Web page data 2711 sent with the mark-send request so that a mark 2710 into which the digital watermark was embedded is displayed in the Web page (step 2706), and sends modified Web page data 2712 to the mark acquisition program C running on the vendor terminal 1112 (step 2707).

The mark acquisition program C stores, via the WWW server 1113, the Web page data sent from the mark management server 1122 into the Web page DB 1114.

After that, when a request is entered from the consumer 1100 via the browser program 1204b, this Web page is sent to the consumer terminal 1101 and displayed on the display unit 1102.

On the other hand, the validity check program C running on the consumer terminal 1101 checks the validity of the Web page when the consumer 1100 enters a request (for example, when the consumer clicks the mark).

Figure 22:
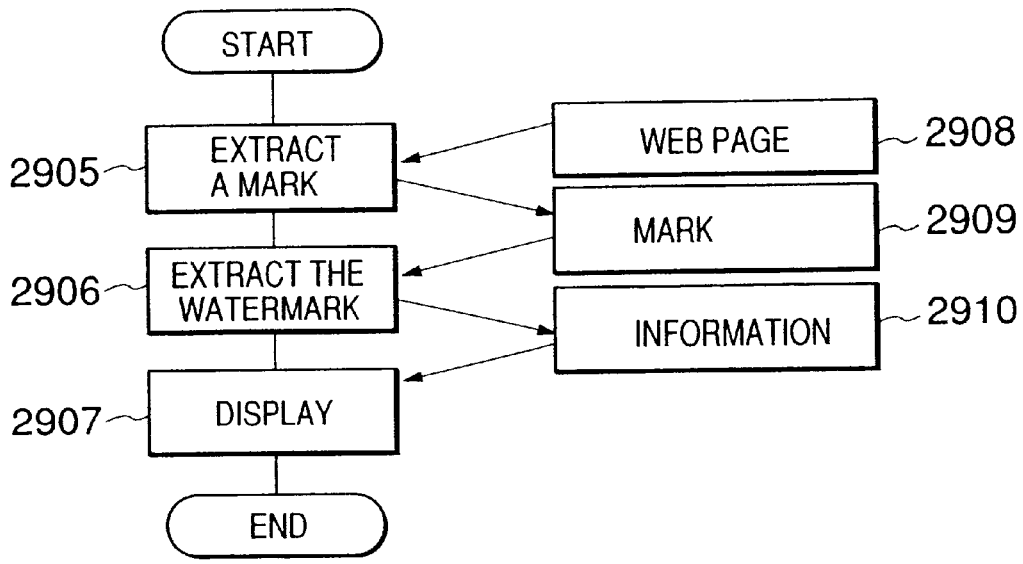
FIG. 22 is a flowchart showing the operation of a consumer terminal used in the sixth embodiment of this invention.

That is, as shown in FIG. 22, the program first extracts a mark 2909 from a Web page 2908 to check its validity (step 2905), extracts information 2910 embedded in the extracted mark 2909 as a digital watermark (step 2906), and displays the extracted information on the display unit 1102 (step 2907).

Information necessary to extract the information 2910, embedded as the digital watermark, from the extracted mark 2909 should be obtained in advance from the mark management server 1122 (for example, the original mark into which the watermark shown in step 2710 of FIG. 21 is not yet embedded, or information identifying algorithm to restore the information 2910 by using difference data between the original mark and the extracted mark 2909). To do so, the validity check program C is designed to send a validity check confirmation information request to the mark management server 1122 as requested by the consumer 1100, and store information received in response to the request in the memory 1204 or in the storage unit 1202. The mark management program C running on the mark management server 1122 is also designed to send the required information back to the consumer terminal 1101 in response to the validity check confirmation information request.

The sixth embodiment of this invention is as described above.

In this embodiment, a mark in which a digital signature is embedded is pasted into a Web page instead of a simple mark. This type of mark enables the authentication of the relation between the Web page and the individual/organization to be validated correctly. The Web page also contains a mark showing the related individual/organization. Because the mark, usually displayed in the Web page, is used to authenticate the relation between the Web page and the individual/organization indicated by the mark, the sixth embodiment does not affect the appearance of the Web page.

A seventh embodiment of this invention will be described below.

The configuration of an authentication system used in the seventh embodiment is basically the same as that of the authentication system explained in the fourth embodiment (FIG. 9 to FIG. 13) except that the validity check program A 1204c in the memory 1204 of the consumer terminal 1101 is replaced by the validity check program d, that the mark management program A 1507b in the memory 1507 of the mark management server 1122 is replaced by the mark management program d, and that the mark acquisition program 1306c in the memory 1306 of the vendor terminal 1112 is replaced by the mark acquisition program d.

The operation of the authentication system used in the seventh embodiment will now be described below.

First, the mark acquisition program d running on the vendor terminal 1112 sends a mark-send request, as well as his own Web page data, to the mark management server 1122.

Figure 23:
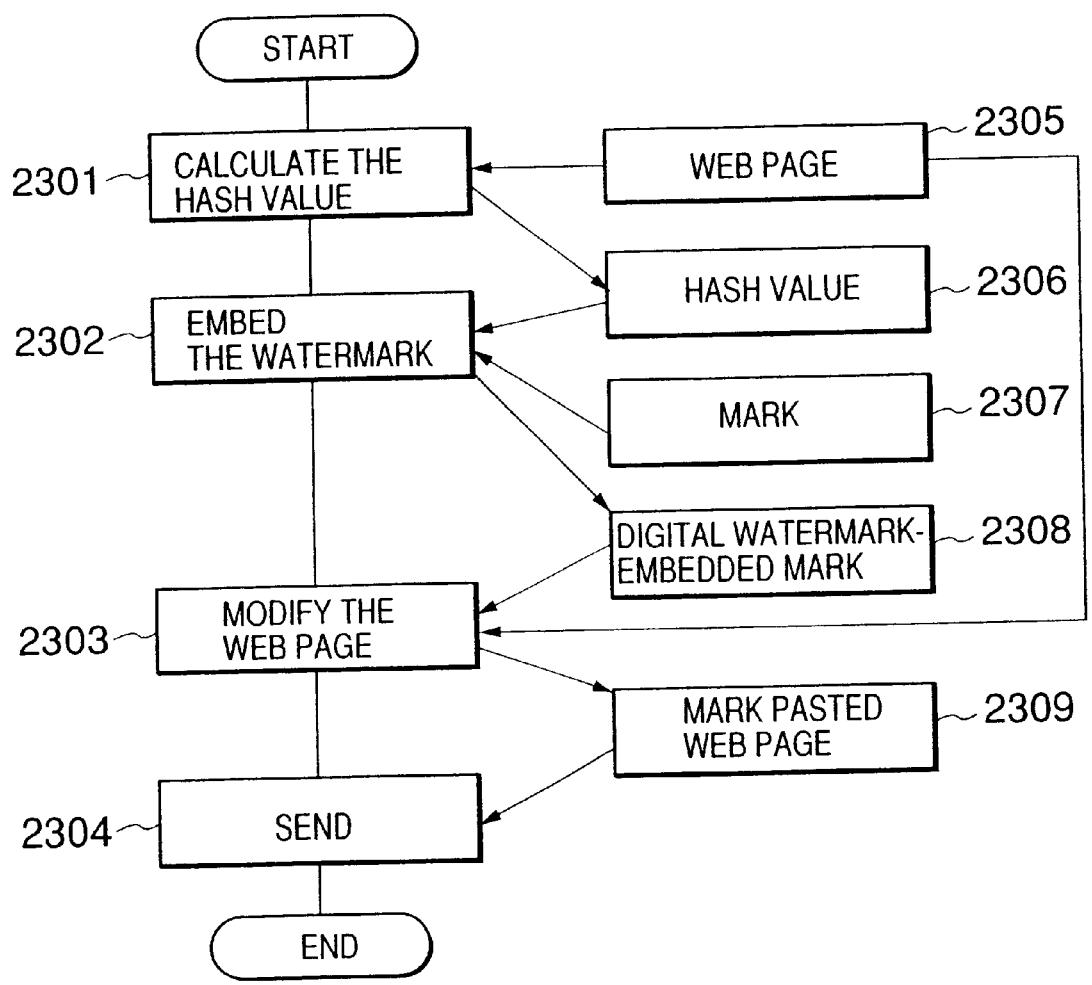
FIG. 23 is a flowchart showing the operation of a mark management server used in a seventh embodiment of this invention.

Upon receiving the request, the mark management program d running on the mark management server 1122 checks if a mark should be sent to the vendor 1110 on the vendor terminal 1112 from which the request was sent and, if it is determined that the mark should be sent, performs processing shown in FIG. 23.

That is, the server 1122 calculates the hash value 2306 of the Web page data 2305 sent with the mark-send request (step 2301) and embeds, as a digital signature, the calculated hash value 2306 into the mark 2307 stored in the mark management DB 1123 (step 2302). The server 1122 then modifies Web page data 2305 sent with the mark-send request so that a mark 2308 into which the digital watermark was embedded is displayed in the Web page (step 2303), and sends the modified Web page data 2309 to the mark acquisition program d running on the vendor terminal 1112 (step 2304).

The mark acquisition program d stores, via the WWW server 1113, the Web page data sent from the mark management server 1122 into the Web page DB 1114.

After that, when a request is entered from the consumer 1100 via the browser program 1204b running on the consumer terminal 1101, this Web page is sent to the consumer terminal 1101 and displayed on the display unit 1102.

On the other hand, the validity check program d running on the consumer terminal 1101 checks the validity of the Web page when the consumer 1100 enters a request (for example, when the consumer clicks the mark).

Figure 24:
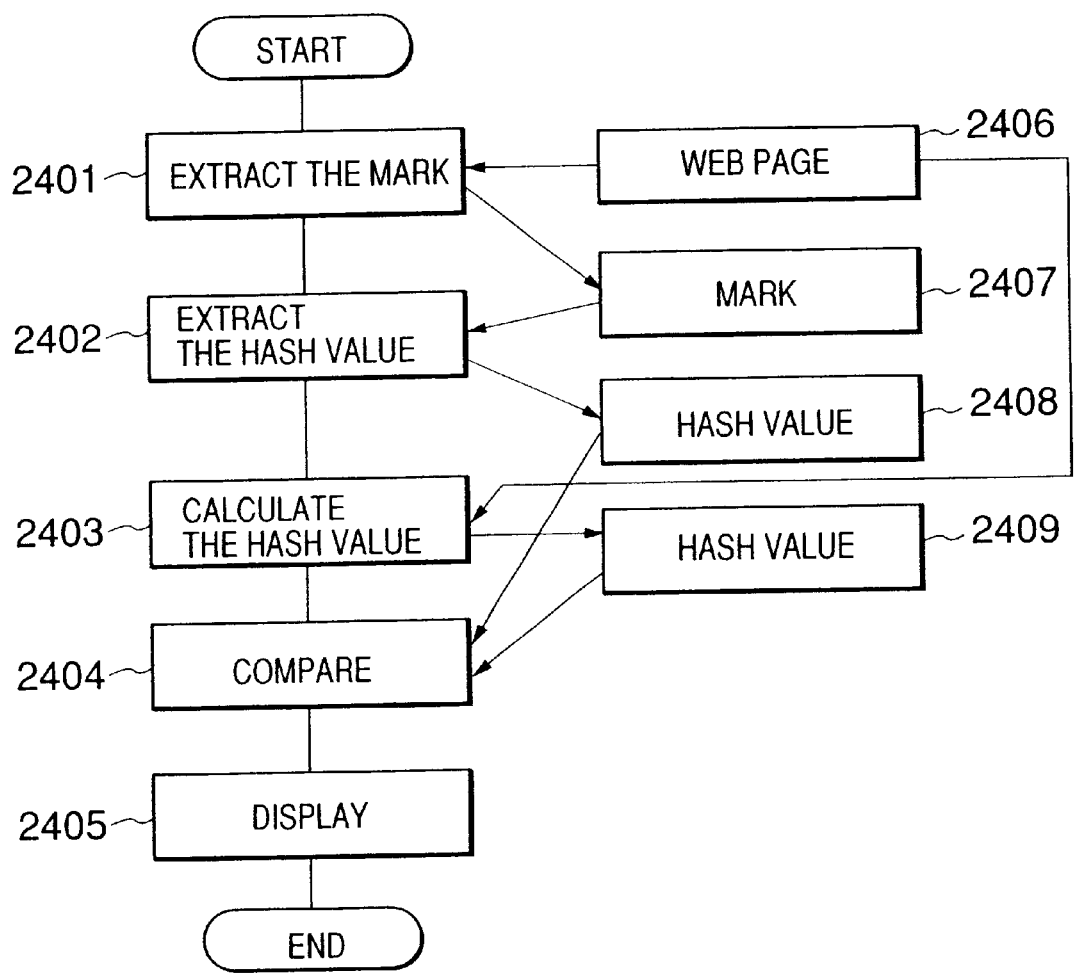
FIG. 24 is a flowchart showing the operation of a consumer terminal used in the seventh embodiment of this invention.

That is, as shown in FIG. 24, the terminal 1101 first extracts a mark 2407 from a Web page 2406 to check its validity (step 2401) and extracts a hash value 2408 embedded in the extracted mark 2407 as a digital watermark (step 2402). The terminal 1101 also calculates a hash value 2409 of the Web page data except the part related to the mark whose validity is to be checked (step 2403) and compares the calculated hash value 2409 with the hash value 2408 extracted from the mark (step 2404). If they match, the terminal 1101 displays a message stating that the mark was validated on the display unit 1102; if they do not match, the terminal 1101 displays a message stating that the mark was not validated on the display unit 1102 (step 2405).

Information necessary to extract the hash value 2408, embedded as the digital watermark, from the extracted mark 2407 should be obtained in advance from the mark management server 1122. To do so, the validity check program d is designed to send a validity check confirmation information request to the mark management server 1122 as requested by the consumer 1100, and store information received in response to the request in the memory 1204 or in the storage unit 1202. The mark management program d running on the mark management server 1122 is also designed to send the required information back to the consumer terminal 1101 in response to the validity check confirmation information request.

In the seventh embodiment, a mark in which the hash value of a Web page is embedded is pasted in a Web page instead of a simple mark. This type of mark enables the user to authenticate that the mark is given to the Web page in which the mark is embedded. The Web page also contains a mark showing the related individual/organization. In addition, because the hash value of the Web page is used as the digital watermark, and always embedded into the mark, the processing does not depend on whether a plurality of types of data are included in the Web page. Because the mark, usually displayed in the Web page, is used to authenticate that the mark is given to the Web page, the seventh embodiment does not affect the appearance of the Web page.

An eighth embodiment of this invention will be described below.

The configuration of an authentication system used in the eighth embodiment is basically the same as that of the authentication system explained in the fourth embodiment (FIG. 9 to FIG. 13).

However, in this embodiment, the consumer terminal 1101, the mark management server 1122, and the vendor terminal 1112 are replaced by the consumer terminal 1800a, the mark management server 1810a, and the vendor terminal 1112a, respectively.

Figure 25:
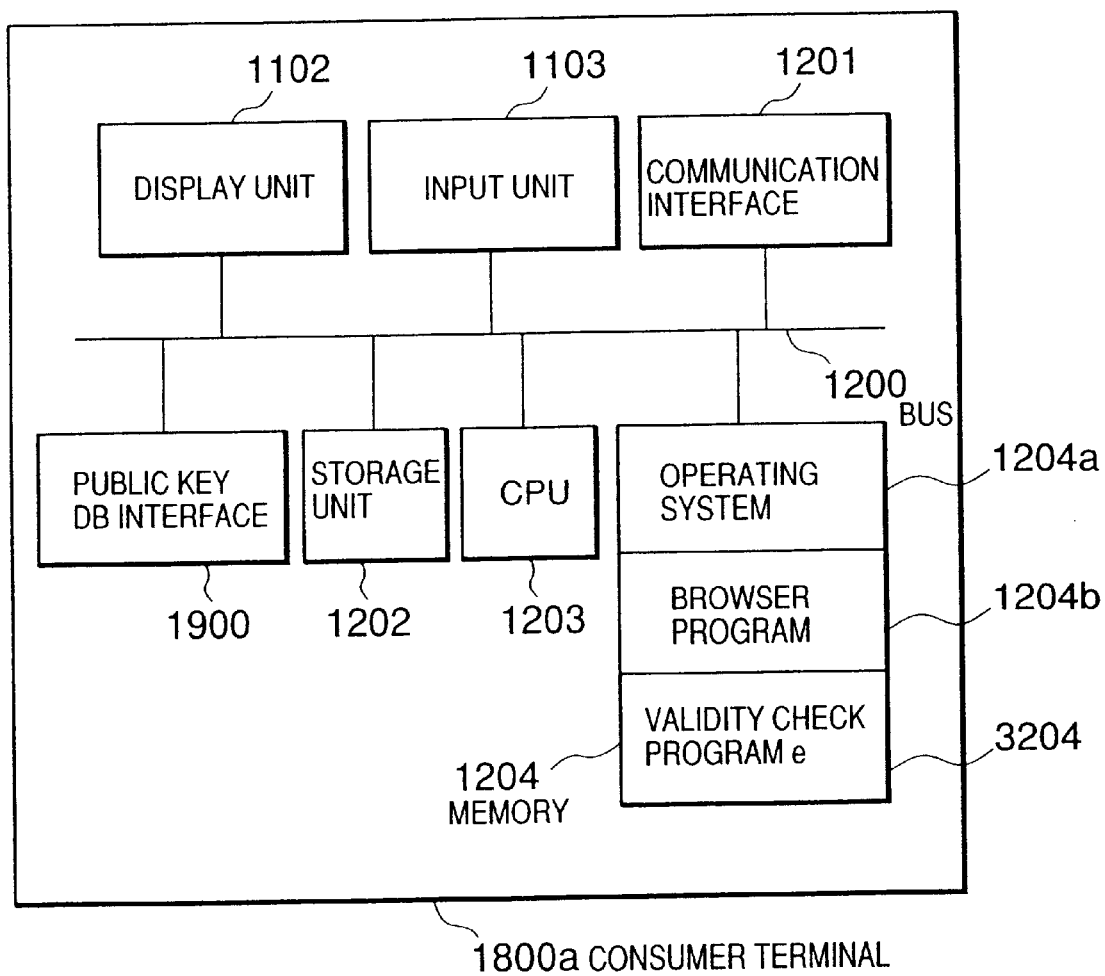
FIG. 25 is a block diagram showing the hardware configuration of the consumer terminal used in the eighth embodiment of this invention.

As shown in FIG. 25, the configuration of the consumer terminal 1800a differs in that the public key DB 1801 explained in the fifth embodiment is connected, that the public key DB interface 1900 is provided, and that the validity check program A 1204c in the memory 1204 is replaced by the validity check program e 3204.

Figure 26:
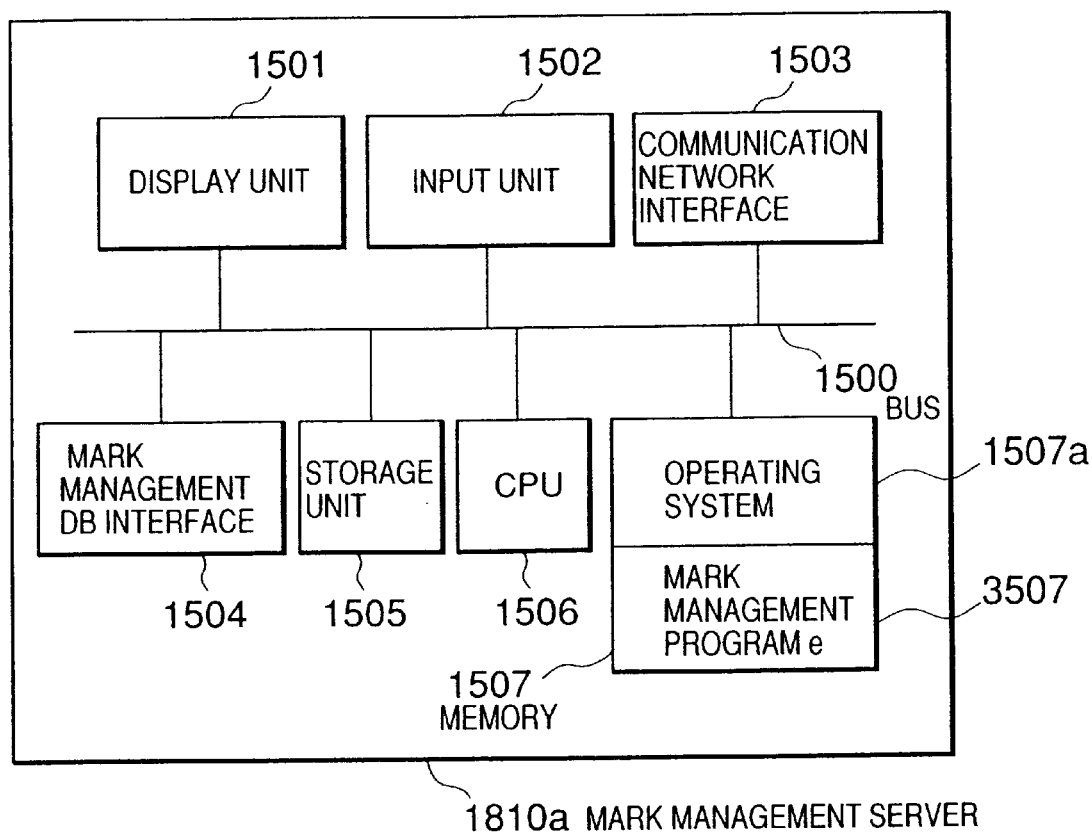
FIG. 26 is a block diagram showing the hardware configuration of a mark management server used in the eighth embodiment of this invention.

The mark management server 1810a also differs in that the mark management program A 1507b in the memory 1507 is replaced by the mark management program e 3507, as shown in FIG. 26.

Figure 27:
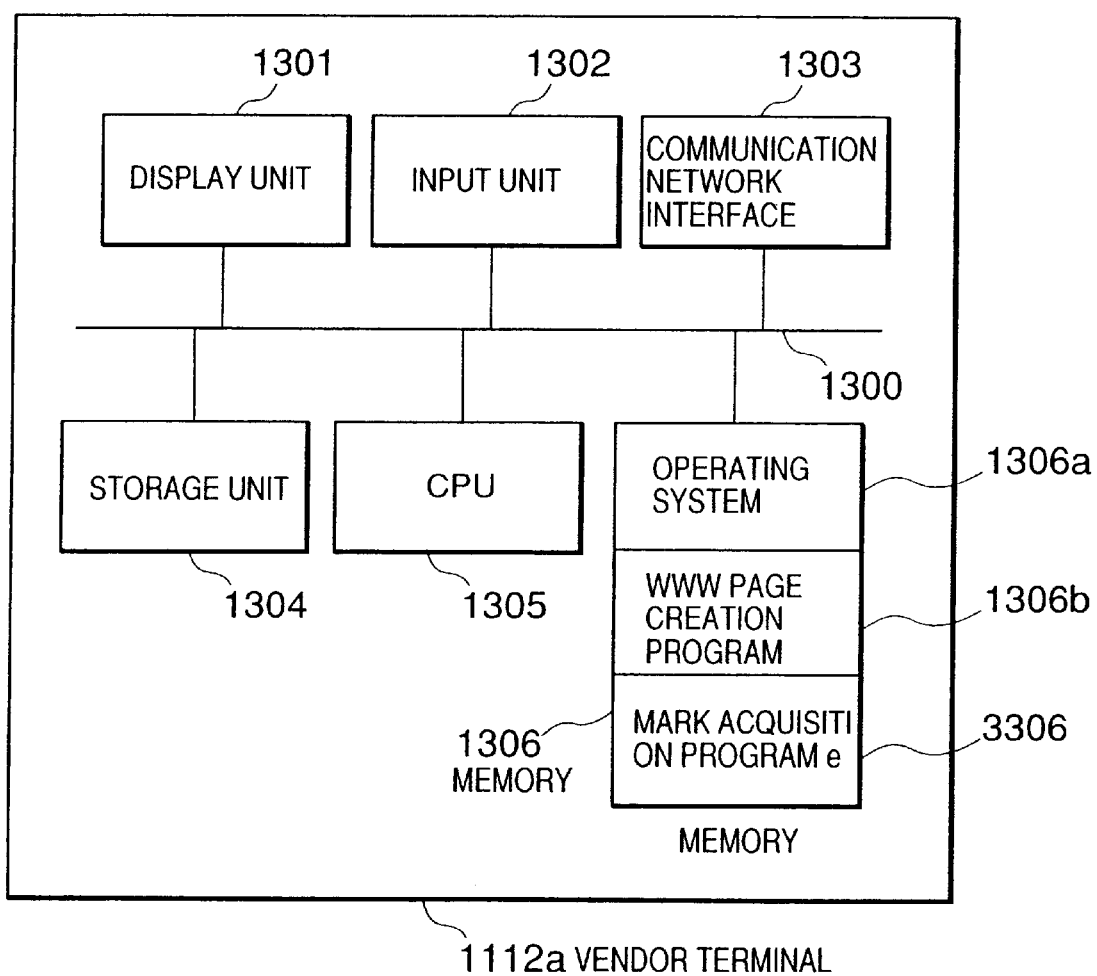
FIG. 27 is a block diagram showing the hardware configuration of a vendor terminal used in the eighth embodiment of this invention.

The vendor terminal 1112a also differs in that the mark acquisition program 1306c in the memory 1306 is replaced by a mark acquisition program e 3306, as shown in FIG. 27.

The operation of the authentication system used in the eighth embodiment will now be described below.

First, the mark acquisition program e 3306 running on the vendor terminal 1112a sends a mark-send request, as well as his own Web page data, to the mark management server 1810a.

Figure 28:
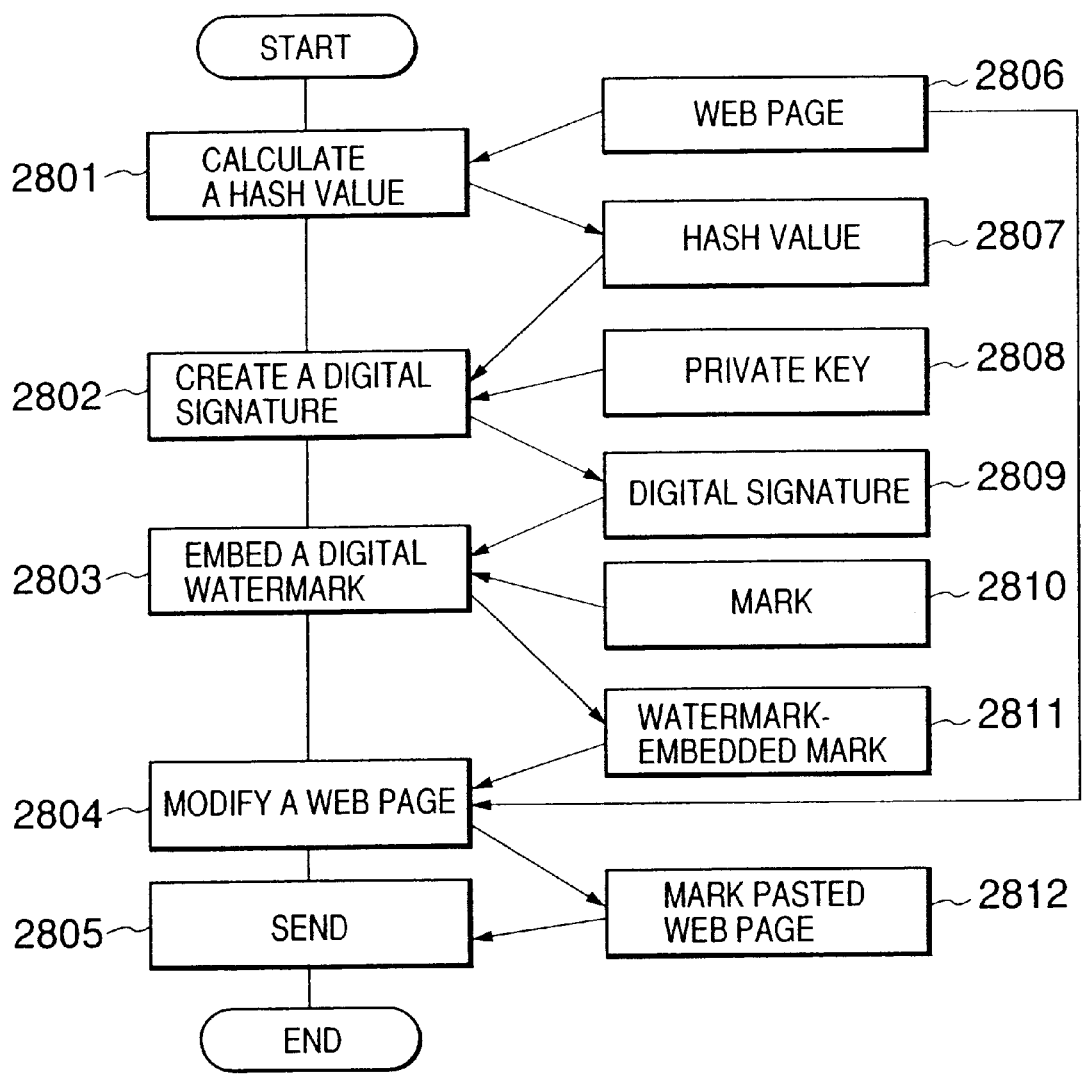
FIG. 28 is a flowchart showing the operation of a mark management server used in the eighth embodiment of this invention.

Upon receiving the request, the mark management program e 3507 running on the mark management server 1810a checks if a mark should be sent to the vendor 1110 on the vendor terminal 1112a from which the request was sent and, if it is determined that the mark should be sent, performs processing shown in FIG. 28.

That is, the server 1810a calculates a hash value 2807 of Web page data 2806 sent with the mark-send request (step 2801), encrypts the hash value 2807 with a private key 2808 of the mark management organization 1121 to generate a digital signature 2809 (step 2802), and embeds the generated digital signature 2809 into a mark 2810, stored in the mark management DB 1123, as a digital watermark (step 2803). The server 1810a then modifies the Web page data 2806 sent with the mark-send request so that a mark 2811 into which the digital watermark was embedded is displayed in the Web page 2806 (step 2804), and sends modified Web page data 2812 to the mark acquisition program e 3306 running on the vendor terminal 1112a (step 2805).

The mark acquisition program e 3306 running on the vendor terminal 1112a stores, via the WWW server 1113, the Web page sent from the mark management server 1810a into the Web page DB 1114.

After that, when a request is entered from the consumer 1100 via the browser program 1204b running on the consumer terminal 1800a, this Web page is sent to the consumer terminal 1800a and displayed on the display unit 1102.

On the other hand, the validity check program e 3204 running on the consumer terminal 1800a checks the validity of the Web page when the consumer 1100 enters a request (for example, when the consumer clicks on the mark).

Figure 29:
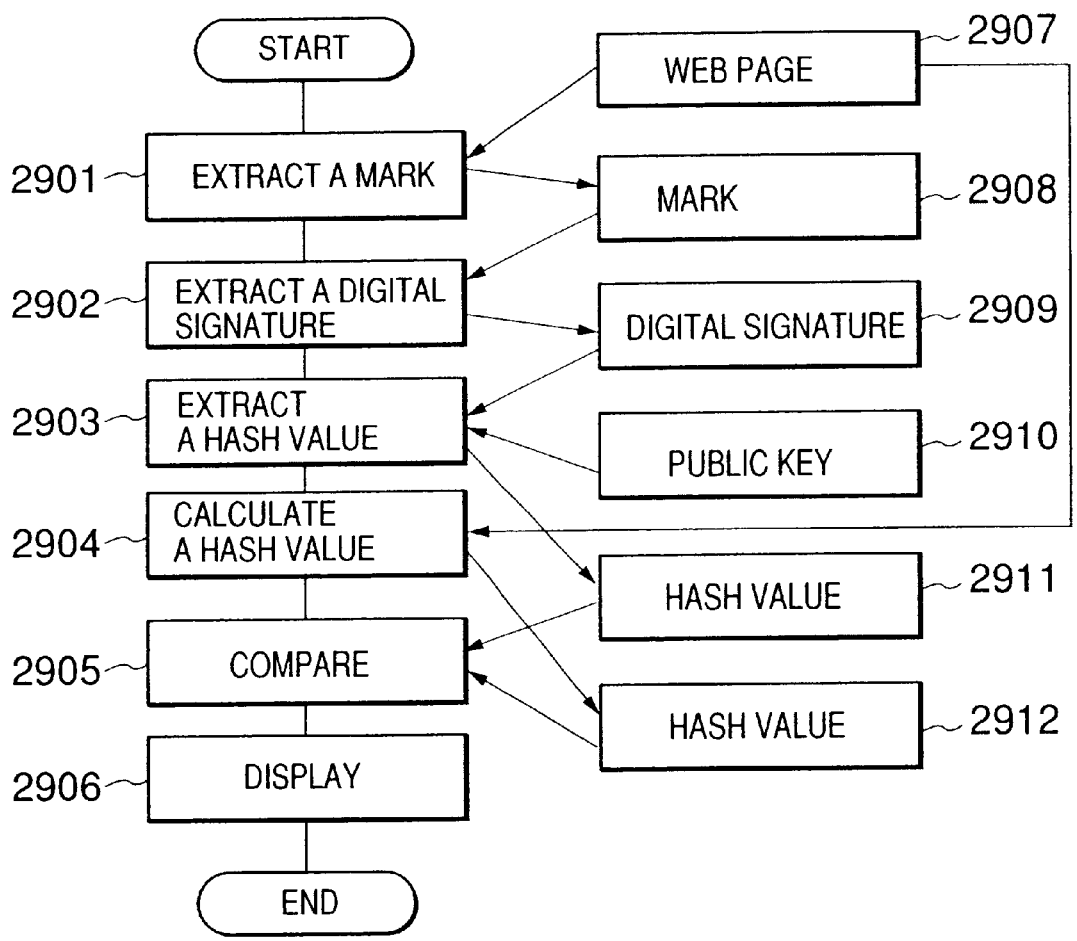
FIG. 29 is a flowchart showing the operation of a consumer terminal used in the eighth embodiment of this invention.

That is, as shown in FIG. 29, the terminal 1800a first gets a public key 2910 of the mark management organization 1121 from the public key DB 1801. Then, the terminal 1800a extracts a mark 2908 from a Web page 2907 to check its validity (step 2901), extracts a digital signature 2909 embedded in the extracted mark 2908 as a digital watermark (step 2902), and decrypts the extracted digital signature using the public key 2910 of the mark management organization 1121 to get a hash value 2911 (step 2903). The terminal 1800a also calculates a hash value 2912 of the Web page data except the part related to the mark 2908 whose validity is to be checked (step 2904), and compares the calculated hash value 2912 with the hash value 2911 generated by decrypting the digital signature extracted from the mark 2908 (step 2905). If they match, the terminal 1800a displays a message on the display unit 1102 stating that the mark was validated; if they do not match, the terminal 1800a displays a message staging that the mark was not validated (step 2906).

Information necessary to extract a hash value 2911, embedded as the digital watermark, from the extracted mark 2908 should be obtained in advance from the mark management server 1810a. To do so, the validity check program e 3204 running on the consumer terminal 1800a is designed to send a validity check confirmation information request to the mark management server 1810a as requested by the consumer 1100, and store information received in response to the request in the memory 1204 or in the storage unit 1202. The mark management program e 3507 running on the mark management server 1810a is also designed to send the required information back to the consumer terminal 1800a in response to the validity check confirmation information request.

In addition, the public key 2910 of the mark management organization 1121 received in response to a public key send request, issued from the consumer 1800a to the mark management server 1810a, is stored in the public key DB 1801. Upon receiving the public key send request, the mark management server 1810a sends its own public key 2910 back to the consumer terminal 1800a as a response.

In the eighth embodiment described above, a mark in which a digital signature, generated by encrypting the hash value of a Web page using the private key of the mark management organization mark, is embedded as a digital watermark and is pasted in a Web page instead of a simple mark. This type of mark enables the authentication of the relation between the Web page and the mark management organization to be validated correctly. The Web page also contains a mark showing the related individual/organization. In addition, because the digital signature for the hash value of the Web page data is always embedded into the mark as the digital watermark, the processing does not depend on whether a plurality of types of data are included in the Web page. Embedding the digital watermark into the mark in the Web page as the digital signature eliminates the need to manage the digital signature separately from the Web page data. Because the mark, usually displayed in the Web page, is used to authenticate that the mark is given to the Web page, the eighth embodiment does not affect the appearance of the Web page.

In the sixth to eighth embodiments described above, the mark management server modifies the Web page data, sent with a mark-send request, so that the mark in which a digital watermark is embedded may be displayed in the Web page. The server then sends the modified Web page data to the mark acquisition program e running on the vendor terminal. This processing may be modified as follows.

That is, the mark management server sends a mark, in which a digital watermark is embedded, to the vendor terminal. The vendor terminal modifies the original of the Web page data sent with the mark-send request so that the mark in which the digital watermark is embedded is displayed in the Web page.

In the sixth to the eighth embodiments, processing on the consumer terminal may be modified as follows:

That is, in the sixth embodiment, the consumer terminal extracts the mark to be validated from the Web page, and sends the extracted mark and a validity check request to the mark management server. In the seventh and eighth embodiments, the consumer terminal sends Web page data containing the mark and the validity check request to the mark management server. On the display unit of the consumer terminal there is displayed a successful or an unsuccessful validity check message sent back from the mark management server. On the other hand, upon receiving a validity check request, the mark management server performs the validity check on the mark in the same way as the consumer terminal performs in the sixth to eighth embodiments. In the sixth embodiment, the mark management server extracts information embedded in the mark sent with the request. If this information matches the information embedded by the mark management server, it sends a successful validity message to the consumer terminal; if not, it sends an unsuccessful validity check message to the consumer terminal. In the seventh embodiment, the mark management server extracts the mark from the Web page sent with the request, extracts the hash value embedded in the mark as the digital watermark, calculates the hash value of the Web page except the area related to the mark to be validated, and compares this value with the hash value extracted from the mark. If they match, the mark management server sends a successful validity check message to the consumer terminal, and if not, it sends an unsuccessful message to the consumer terminal. In the eighth embodiment, the mark management server extracts the mark from the Web page sent with the request, extracts the digital signature embedded in the extracted mark as the digital watermark, and extracts the hash value by decrypting the digital signature with a public key of the mark management organization. The mark management server calculates the hash value of the Web page data except the area related to the mark to be validated, and compares this value with the hash value generated by decrypting the digital signature extracted from the mark. If they match, the mark management server sends a successful validity check message to the consumer terminal, and if not, it sends an unsuccessful message to the consumer terminal.

The above-described sixth to eighth embodiments may be applied not only to Web pages but also to digital data to be used in various types of electronic commerce. For example, when drawing data is used in various types of electronic commerce, vendor's marks are attached to drawings data to allow the validity of the drawings to be authenticated. As described earlier, a mark need not always be image data. For example, when audio data is used in electronic commerce, the audio data representing a vendor or a copyright holder may be added before or after audio data, and a digital watermark described in the sixth to eighth embodiments may be embedded into the added audio data.

The embodiments of this invention are described above.

The programs used in each of the above-described embodiments may be recorded on various types of recording media, including a floppy disk, CD-ROM, DVD, and so forth for distribution to a unit on which they are executed. Alternatively, the programs may be downloaded to the unit from some other server connected to the network to which the unit is connected.

Each embodiment described above may be modified in other specific forms without departing from the spirit or essential characteristics thereof.

As described above, this invention provides a technique allowing the relation between digital data and an individual/organization to be authenticated more reliably. At the same time, an individual/organization associated with digital data may be presented directly to the user so that the relation between the digital data and the individual/organization may be authenticated.

What is claimed is:

1. A validity check system comprising:
    an information browser device which displays digital data; and
    an information publisher device which stores said digital data in a state that said digital data can be displayed in said information browser device,
    wherein said information publisher device comprises:
        a storage unit which stores check data which has been related to a digital data validity check unit in a state that said check data may be displayed in said information browser device together with said digital data,
    wherein said information browser device comprises:
        a display unit which displays said digital data and said check data, and
    wherein said digital data validity check unit displays validity checkable information on said display device with which it is possible to check validity of said digital data displayed on said display device together with said check data.

2. A validity check system according to claim 1, wherein when an information browser selects said check data which is displayed on said display device together with said digital data through an input device, said digital data validity check unit transmits a check request as to validity of said digital data to a device linked to said check data and obtains said validity checkable information from said device linked to said check data.

3. A validity check system according to claim 2, further comprising:
    a management device which manages said check data issued,
    wherein said device linked to said check data is said management device, and
    wherein said management device comprises:
        a transmitting unit which transmits said validity checkable information in response to said check request from said digital data validity check unit.

4. A validity check system according to claim 3, wherein said information management device comprises:
    a verifying unit which, in response to said check request from said digital data validity check unit, checks validity of said digital data displayed together with said check data on said display device, and wherein said transmitting unit transmits a check result to said digital data validity check unit as said validity checkable information.

5. A validity check system according to claim 4, wherein said check request includes information as to said digital data displayed together with said check data on said display device,
    wherein said management device comprises:
        a second storage unit which stores information as to said digital data of an information publisher to which said check data has been issued, and
    wherein said verifying unit of said management device carries out said verification by using said information as to said digital data contained in said check request with said information as to said digital data stored in said second storage unit.

6. A validity check system according to claim 5, wherein said information as to said digital data is information which enables identifying at least one among said digital data, an information publisher of said digital data and an information publisher device.

7. A validity check system according to claim 6, wherein said information as to said digital data is an address which enables identifying an information publisher device which publishes said digital data.

8. A validity check system according to claim 4, wherein if said check result received from said management device in response to said check request indicates that validity of said digital data has been confirmed, then said digital data validity check unit displays said check result on said display device.

9. A validity check system according to claim 4, wherein if said check result received from said management device in response to said check request indicates that validity of said digital data has not been confirmed, then said digital data validity check unit displays said check result on said display device.

10. A validity check system according to claim 3, further comprising:
    an issue device which issues to an information publisher said check data to which a link to said management device is set,
    wherein said issue device issues said check data to said information publisher if it is judged that said information publisher who had requested issuance of said check data meets a predetermined condition.

11. A validity check system according to claim 10, wherein said issue device comprises:
    a judging unit which makes said judgement.

12. A validity check system according to claim 10, wherein said management device and said issue device are constructed in the same apparatus.

13. A validity check system according to claim 1, wherein when an information browser selects said check data which is displayed on said display device together with said digital data through an input device, said digital data validity check unit displays said validity checkable information by employing information which is set in said check data.

14. A validity check system according to claim 13, wherein said digital data validity check unit verifies validity of said digital data by employing said information which is set to said check data and information as to said digital data, and displays the result of verification as said validity checkable information on said display device.

15. A validity check system according to claim 14, wherein said information as to said digital data is information which enables identifying at least one among said digital data, an information publisher of said digital data and an information publisher device, and
    wherein said information which is set to said check data is information which enables identifying at least one among said information publisher to which said check data has been issued, said information publisher device, and said digital data of said information publisher.

16. A validity check system according to claim 14, wherein said digital data validity check unit displays said check result on said display device if said check result indicates that validity of said digital data has been confirmed.

17. A validity check system according to claim 14, wherein said digital data validity check unit displays said check result on said display device, if said check result indicates that validity of said digital data has not been confirmed.

18. A validity check system according to claim 1, wherein said digital data is a web page, and wherein said check data is mark image data.

19. An information browser device which displays digital data comprising:

a display unit which accesses to an information publisher device which stores said digital data and check data which has been related to digital data validity check unit in a state that said check data can be displayed on said information browser device together with said digital data and which displays said digital data and said check data on a display device; and said digital data validity check unit, wherein said digital data validity check unit displays on said display device validity checkable information with which it is possible to check validity of said digital data displayed together with said check data.

20. An information browser device according to claim 19, wherein said digital data validity check unit transmits, when an information browser selects said check data displayed together with said digital data on said display device through an input device, a check request as to validity of said digital data to a device linked to said check data and obtains said validity checkable information from said device linked to said check data.

21. An information browser device according to claim 20, wherein if validity checkable said information received from said linked device in response to said check request indicates that validity of said digital data has been confirmed, said digital data validity check unit displays said validity check information on said display device.

22. An information browser device according to claim 20, wherein if said validity checkable information received from said linked device in response to said check request indicates that validity of digital data has not been confirmed, then said digital data validity check unit displays said validity checkable information on said display device.

23. An information browser device according to claim 19, wherein when an information browser selects said check data displayed together with said digital data on said display device through an input device, said digital data validity check unit displays said validity checkable information to said display device.

24. An information browser device according to claim 23, wherein said digital data validity check unit verifies validity of said digital data by using information set to said check data with information as to said digital data, and displays the check result on said display device as said validity checkable information.

25. An information browser device according to claim 24, wherein said information as to said digital data is information which enables identifying at least one among said digital data, said information publisher of said digital data and said information publisher device, and wherein said information which is set to said check data is information which enables identifying at least one among said information publisher to whom said check data has been issued, said information publisher device, and said digital data of said information publisher.

26. An information browser device according to claim 24, wherein said digital data validity check unit displays the check result on said display device, if said check result indicates that validity of said digital data has been confirmed.

27. An information browser device according to claim 24, wherein said digital data validity check unit displays the check result on said display device, if said check result indicates that validity of said digital data has not been confirmed.

28. An information browser device according to claim 19, wherein said digital data is a web page, and wherein said check data is mark image data.

29. An information publisher device which stores digital data in a state that said digital data can be displayed on an information browser device which makes access to said information publisher device, comprising:

a storage unit which stores check data which has been related to validity checkable information in a state that said information browser device can display said check data together with said digital data; and a transmitting unit which transmits said digital data and said check data in response to said access from said information browser device.

30. An information publisher device according to claim 29, wherein a link to a device to which a request for said validity checkable information is transmitted is set to said check data.

31. An information publisher device according to claim 30, wherein said validity checkable information is information which enables identifying at least one among an information publisher to whom said check data has been issued, said information publisher device, and said digital data of said information publisher.

32. An information publisher device according to claim 29, wherein said validity checkable information is set to said check data.

33. An information publisher device according to claim 29, wherein said digital data is a web page, and wherein said check data is mark image data.

34. An information management device which manages check data issued to an information publisher, wherein said check data which has been related to digital data validity check unit and is displayed together with said digital data on an information browser device which displays said digital data, wherein said digital data validity check unit transmits a check request as to validity of said digital data to a management device to obtain validity checkable information, with which it is possible to check validity of said digital data, from said management device, and wherein said management device comprises:

a transmitting unit which transmits, in response to said check request from said digital data validity check unit, said validity checkable information as to said digital data displayed on said information browser device together with said check data to said digital data validity check unit.

35. A management device according to claim 34, wherein said transmitting unit, in response to said check request, verifies validity of said digital data displayed together with said check data on said information browser device, and transmits the check result to said digital data validity check unit as said validity checkable information.

36. A management device according to claim 35, further comprising:
  a storage unit which stores information as to said digital data of an information publisher to whom check data has been issued,
  wherein said check request includes information as to said digital data displayed together with said check data on said information browser device, and
  wherein said transmitting unit carries out said verification by using said information as to said digital data contained in said check request with said information as to said digital data stored in said storage unit.

37. A management device according to claim 36, wherein said information as to said digital data is information which enables identifying at least one among said digital data, an information publisher of said digital data and an information publisher device.

38. A management device according to claim 34, further comprising:
  an issue unit which issues said check data to said information publisher who has requested issuance of said check data, if it is judged that said information publisher meets a predetermined condition.

39. A management device according to claim 38, further comprising:
  a judging unit which makes said judgement.

40. A management device according to claim 34, wherein said digital data is a web page, and
  wherein said check data is mark image data.

41. An issue device which issues check data from an issuer of check data to an information publisher who publishes digital data, said check data being displayed together with said digital data on an information browser device which displays said digital data, said check data having been related to digital data validity check unit for said digital data,
  wherein said issue device issues said check data from said issuer of check data to said information publisher, if it is judged that said information publisher who had requested issuance of said check data meets a predetermined condition.

42. An issue device according to claim 41, wherein said issue device comprises:
  a judge unit which makes said judgement.

43. An issue device according to claim 41, wherein said digital data is a web page, and
  wherein said check data is mark image data.

44. A program product comprising computer readable program code which constructs, on a computer, an information browser device which displays digital data and a computer usable medium which embodies said computer readable program code, wherein said computer readable program code comprises:
  program code which realizes a display control unit which accesses an information publisher device which stores said digital data and check data which has been related to a digital data validity check unit in a state that said check data can be displayed on said information browser device together with said digital data, and which displays said digital data and said check data on a display device; and
  program code which realizes digital data validity check unit,
  wherein said digital data validity check unit displays on said display device said validity checkable information, with which it is possible to check validity of said digital data displayed together with said check data.

45. A program product according to claim 44, wherein said digital data validity check unit transmits, when an information browser selects said check data displayed together with said digital data on said display device through an input device, a check request as to validity of said digital data to a device linked to said check data and obtains said validity checkable information from said device linked to said check data.

46. A program product according to claim 45, wherein when an information browser selects said check data displayed together with said digital data on said display device through an input device, said digital data validity check unit displays said validity checkable information on said display device by employing information which is set to said check data.

47. A program product according to claim 46, wherein said digital data validity check unit verifies validity of said digital data by using said information which is set to said check data with information as to said digital data, and displays the result of verification as said validity checkable information.

48. A program product according to claim 47, wherein said information as to said digital data is information which enables identifying at least one among said digital data, an information publisher of said digital data and said information publisher device, and
  wherein said information which is set to said check data is information which enables identifying at least one among said information publisher to which said check data has been issued, said information publisher device, and said digital data of said information publisher.

49. A program product according to claim 44, wherein said digital data is a web page, and
  wherein said check data is mark image data.

50. A program product comprising computer readable program code which constructs, on a computer, an information publisher device which stores digital data in a state that said digital data can be displayed on an information browser device which makes access to said information publisher device and a computer usable medium which embodies said computer readable program code, wherein said computer readable program code comprises:
  program code which realizes a storage unit which stores check data which has been related to validity checkable information, with which it is possible to check validity of said digital data, in a state that said information browser device can display said check data together with said digital data; and
  program code which realizes a transmitting unit which transmits said digital data and said check data in response to said access from said information browser device.

51. A program product according to claim 50, wherein a link to a device to which a request for said validity checkable information is transmitted is set to said check data.

52. A program product according to claim 51, wherein said validity checkable information is information which enables identifying at least one among an information publisher to whom said check data has been issued, said information publisher device, and said digital data of said information publisher.

53. A program product according to claim 50, wherein when said validity checkable information is set to said check data.

54. A program product comprising computer readable program code which constructs, on a computer, a management device which manages check data which has been issued to an information publisher and a computer usable medium which embodies said computer program code, wherein said check data has been related to a digital data validity check unit, and is displayed together with said digital data on an information browser device which displays said digital data, wherein said digital data validity check unit transmits a check request as to validity of said digital data to said management device and obtains validity checkable information, with which it is possible to check validity of said digital data, from said management device, and wherein said computer readable program code comprises:
program code which realizes a transmitting unit which transmits said validity checkable information, in response to said check request from said digital data validity check unit, as to said digital data displayed together with said check data to said digital data validity check unit.

55. A program product according to claim 54, wherein said transmitting unit verifies, in response to said check request, validity of said digital data displayed together with said check data on said information browser device, and transmits the check result to said digital data validity check unit as said validity checkable information.

56. A program product according to claim 54, further comprising:

program code which realizes a storage unit which stores information as to said digital data of said information publisher to which said check data has been issued, wherein said check request includes information as to said digital data displayed together with said check data on said information browser device, and wherein said transmitting unit carries out said verification by using said information as to said digital data contained in said check request with said information as to said digital data stored in said storage unit.

57. A program product according to claim 56, wherein said information as to said digital data is information which enables identifying at least one among said digital data, said information publisher of said digital data and said information publisher device.

58. A program product comprising computer readable program code which constructs, on a computer, an issue device which issues check data from an issuer of check data to an information publisher publishing digital data, said check data being displayed together with said digital data on an information browser device displaying said digital data, and said check data having been related to a digital data validity check unit and a computer usable medium which embodies said computer readable program code, wherein said computer readable program code comprises:
program code which realizes an issuing unit which issues said check data from said issuer of check data to said information publisher, if it is judged that said information publisher which had requested issuance of said check data meets a predetermined condition.

59. A program product according to claim 58, wherein said computer readable program code further comprises:

program code which realizes a judging unit which makes said judgement.

60. A method of digital data validity check in which an information browser which browses digital data is provided with validity checkable information, with which it is possible to check validity of said digital data, said method comprising the steps of:

letting an information publisher which publishes said digital data store check data in a state that said check data can be displayed on an information browser device together with said digital data, said check data having been related to a digital data validity check unit; and letting said information browser device access said information publisher device and display said digital data and said check data on a display device, and if said information browser device selects said check data displayed on said display device, letting said digital data validity check unit operate to display said validity checkable information on said display device.

\* \* \* \* \*